(12) United States Patent
Katoh et al.

(10) Patent No.: US 8,099,839 B2
(45) Date of Patent: Jan. 24, 2012

(54) CLIP

(75) Inventors: Makoto Katoh, Toyota (JP); Haruhisa Kamiya, Anjo (JP); Shinichi Sawada, Aichi-ken (JP); Minoru Shibata, Aichi-ken (JP); Yasuhiro Sakakibara, Aichi-ken (JP)

(73) Assignees: Daiwa Kasei Industry Co., Ltd., Okazaki-shi (JP); Toyoda Gosei Co., Ltd., Nishikasugai-gun (JP)

( * ) Notice: Subject to any disclaimer, the term of this patent is extended or adjusted under 35 U.S.C. 154(b) by 466 days.

(21) Appl. No.: 12/308,955

(22) PCT Filed: Aug. 1, 2007

(86) PCT No.: PCT/JP2007/065563
§ 371 (c)(1),
(2), (4) Date: Jan. 29, 2009

(87) PCT Pub. No.: WO2008/016178
PCT Pub. Date: Feb. 7, 2008

(65) Prior Publication Data
US 2009/0320251 A1    Dec. 31, 2009

(30) Foreign Application Priority Data
Aug. 2, 2006 (JP) .................. 2006-211211

(51) Int. Cl.
*F16B 21/02* (2006.01)
(52) U.S. Cl. ............. 24/458; 24/297; 24/289; 296/1.08

(58) Field of Classification Search .............. 24/663, 24/458, 572.1, 581.1, 581.11, 289, 297; 296/1.08, 296/146.7, 191, 39.1
See application file for complete search history.

(56) References Cited

U.S. PATENT DOCUMENTS

| | | | |
|---|---|---|---|
| 7,753,634 B2 * | 7/2010 | Nakazato | 411/553 |
| 7,955,038 B2 * | 6/2011 | Silbereisen et al. | 411/552 |
| 2001/0052210 A1 * | 12/2001 | Mizutani et al. | 52/208 |
| 2005/0150087 A1 | 7/2005 | Lydan | |
| 2005/0236859 A1 | 10/2005 | Sakakibara et al. | |
| 2009/0199371 A1 * | 8/2009 | Katoh et al. | 24/458 |

FOREIGN PATENT DOCUMENTS

| | | |
|---|---|---|
| DE | 20 2005 019 612 U1 | 3/2006 |
| EP | 0 641 939 A1 | 3/1995 |
| JP | A-11-70838 | 3/1999 |

* cited by examiner

*Primary Examiner* — Robert Sandy
*Assistant Examiner* — Michael Lee
(74) *Attorney, Agent, or Firm* — Oliff & Berridge, PLC

(57) ABSTRACT

Each clip 1 is fitted into a cutaway groove portion 6 of a pedestal portion 5 of each assembling portion 3 provided on a bottom surface portion of a console box 2. After that, a positioning boss 7 is fitted into a long hole 43 formed in an attachment receiving member 41, and at the same time, a fitting head portion 28 of each clip 1 is fitted into each long hole 42 formed in the attachment receiving member 41. As each fitting head portion 28 is fitted into each long hole 42 formed in the attachment receiving member 41 and a boss portion 22 slides in the cutaway groove portion 6. Each of a pair of elastic locking pieces 31 is elastically locked with the periphery of each longer side portion of each long hole 42.

8 Claims, 25 Drawing Sheets

CLIP

TECHNICAL FIELD

The present invention relates to a clip for use in attaching an attachment member such as a console box and an instrument panel to an attachment receiving member such as an automobile body. In particular, the present invention relates to a clip that enables attachment and detachment of the attachment member to and from the attachment receiving member in an extremely easy one-touch operation while the clip is always integrally handled with the attachment member to which the clip is assembled.

BACKGROUND ART

Conventionally, various kinds of clips have been proposed for use in attaching a console box, instrument panel, and the like to various kinds of panels constituting an automobile body.

For example, there is a console device to be attached on a floor of a vehicle body. In attaching the console device on the floor of the vehicle body, a fitting hole formed on a flange of the console box and a through hole formed on a seat portion are aligned to two fitting holes formed on the floor of the vehicle body, and in this state, a clip comprising an outer member and an inner member is inserted through the holes (for example, see Patent Document 1).

[Patent Document 1] Japanese Unexamined Patent Publication No. 11(1998)-70838, paragraphs [0028] to [0037] and FIG. 2

In the clip comprising the outer member and inner member described in the Patent Document 1, when the inner member is withdrawn from the outer member, the diameter of the outer member is decreased to enable the clip to be detached from the respective fitting holes of the floor and the flange, the fitting hole of the floor, and the through hole of the seating portion. When the inner member is inserted into the outer member, the diameter of the outer member is enlarged to restrict the clip by the respective fitting holes and through hole, so as to fasten the console box to the floor of the vehicle body.

DISCLOSURE OF THE INVENTION

When the console box is fastened to the floor of the vehicle body by use of the clip for use in the console device described in the Patent Document 1, the positional deviation between the respective fitting holes of the console box and the respective long holes of the floor in the longitudinal direction of the long holes can be absorbed by imparting a long hole shape to the respective fitting holes created on the floor of the vehicle body. However, there still remains a problem that the positional deviation in a direction at right angle relative to this longitudinal direction cannot be absorbed.

In addition, to fasten the console box to the floor of the vehicle body, first of all, it is required to take an operation of positioning the console box on the floor of the vehicle body, and in this state, inserting the clip through the fitting holes and long holes, and subsequently, to take an operation of inserting the inner member to the outer member by depressing the inner member into the outer member. These operations are much troublesome, and lead to a problem that much time is required for fastening the console box to the floor of the vehicle body.

The present invention has been made to solve the problems described above, and an objective thereof is to provide a clip which is capable of easily absorbing the positional deviation of the attachment member relative to the attachment receiving member in a state where the clip is always integrally handled with the attachment member to which the clip is assembled, and which also enables attachment and detachment of the attachment member to and from the attachment receiving member in an extremely easy one-touch operation.

To achieve the object, the present invention provides a clip assembled to an upper surface portion of a pedestal portion provided on one surface of an attachment member and used to attach the attachment member to an attachment receiving member, wherein the pedestal portion formed into a substantially square-bracket-like shape opened downward when seen from side comprises a horizontally long cutaway groove portion formed inward from a side surface portion of an upper wall, the attachment member comprises a positioning boss provided in an upright posture on the one surface, the attachment receiving member comprises a first long hole which is penetratively formed along a direction at substantially right angle relative to a longitudinal direction of the cutaway groove portion and to which the positioning boss is fitted, wherein the clip comprising: a flat plate portion to be brought into contact with an upper surface portion of the upper wall; a boss portion which is extended vertically downward from a bottom surface of the flat plate portion into a width substantially equal to a width of the cutaway groove portion, and is fitted to the cutaway groove portion; a flange portion having a predetermined thickness which is extended from a lower end portion of the boss portion outward to the opposite sides of the cutaway groove portion so as to be brought into contact with a bottom surface portion of the upper wall; a fitting head portion having a substantially square shape when seen from above which is provided in an upright posture on an upper surface of the flat plate portion and is fitted to a second long hole penetratively formed in the attachment receiving member along a direction at substantially right angle relative to a longitudinal direction of the cutaway groove portion; a pair of elastic locking pieces elastically deformable in a insertion direction of the fitting head portion and is provided on opposite side surface portions of the fitting head portion in a longitudinal direction of the cutaway groove portion, and is formed with, at their respective lower end portion, a locking protrusion protruding outward to a predetermined height; and a pair of contact portions extended to a predetermined height upward at substantially right angle from the opposite edge portions of the flat plate in a direction at substantially right angle relative to a longitudinal direction of the cutaway groove, wherein the positioning boss is fitted to a first long hole penetratively formed in the attachment receiving member, and as the fitting head portion is fitted to the second long hole penetratively formed in the attachment receiving member and the boss portion moves in the cutaway groove portion, the pair of contact portions is brought into contact with the attachment receiving member and the pair of elastic locking pieces is elastically locked with a periphery of each longer side portion of the second long hole.

Furthermore, in the inventive clip, the attachment member comprises: a rib portion provided in an upright posture on the outside of the side surface of the upper wall of the pedestal; and an extending portion elastically deformable downward and extending from the rib portion at a height opposing to the flange portion substantially vertically up to an inlet portion of the cutaway groove portion, and wherein when the boss portion is fitted to the cutaway groove portion, the flange portion moves while depressing the extending portion downward.

Furthermore, in the inventive clip, the attachment member has a tool hole penetratively formed at a position opposing to the upper wall of the pedestal portion, the flange portion has a recessed portion into which a top end portion of a tool is inserted and formed at the bottom, a portion of the fitting head portion opposing to an inner peripheral surface of the second long hole and the boss portion respectively assumes a substantially square shape as a whole in a horizontal cross section, a pair of opposing corners respectively creates a circular arc having one side of the respective square as a diameter, and the other pair of opposing corners respectively creates a substantially right angle, and when a tool is inserted through the tool hole into the recessed portion and rotated by 90 degreed counterclockwise, locked state between the second long hole and the pair of elastic locking pieces is released.

Furthermore, the inventive clip further comprises a flat plate-like water-proof elastic member formed with a through hole having a substantially square shape when seen from above and having a width substantially equal to a width of the fitting head portion, and is brought into contact with the upper surface of the flat plate portion by fitting and inserting the fitting head portion into the through hole, wherein the water-proof elastic member has a thickness which is larger than a height of the contact portions and also enables the water-proof elastic member to be locked with the pair of elastic locking pieces.

According to the clip of the present invention, the boss portion vertically extended downward from the bottom surface of the flat plate portion of the clip is slipped into a horizontally long cutaway groove portion formed on the upper wall of the pedestal portion of the attachment member from one side surface portion. As a result, the upper wall of the pedestal portion is pinched between the flat plate portion and the flange portion formed on the lower end portion of the boss portion. Therefore, the clip can be always handled integrally with the attachment member to which the clip is assembled.

After the boss portion of the clip is slipped in and assembled to the cutaway groove portion of the pedestal portion, the positioning boss is fitted to the first long hole formed in the attachment receiving member in the direction at substantially right angle relative to the longitudinal direction of the cutaway groove portion. At the same time, the fitting head portion of the clip is fitted into the second long hole formed in the attachment receiving member in the direction at substantially right angle relative to the longitudinal direction of the cutaway groove portion. As the fitting head portion is fitted into the second long hole formed in the attachment receiving member and the boss portion moves in the cutaway groove portion, a pair of contact portions extended upward to a predetermined height at substantially right angle from the opposite edge portions in the direction at substantially right angle relative to the longitudinal direction of the cutaway groove portion of the flat plate portion is brought into contact with the attachment receiving member. At the same time, a pair of elastic locking pieces is elastically locked with the periphery of each longer side portion of the second long hole.

As a result of this, the positional deviation of the attachment member in the longitudinal direction of the first long hole and the second long hole can be absorbed. At the same time, by fitting the positioning boss of the attachment member to the first long hole of the attachment receiving member, positioning in the direction at right angle relative to the longitudinal direction of the first long hole of the attachment receiving member can be made possible. Further, as the boss portion vertically extended downward from the bottom surface of the flat plate portion of the clip moves within the cutaway groove portion, the clip moves in a direction at right angle relative to the longitudinal direction of the second long hole. Therefore, the positional deviation of the clip at right angle relative to the longitudinal direction of the second long hole of the attachment receiving member can be also absorbed.

Therefore, while always handling the clip integrally with the attachment member to which the clip is assembled, the positional deviation of the attachment member relative to the longitudinal direction of the first long hole formed in the attachment receiving member can be easily absorbed. In this state, the attachment member can be positioned in the direction at right angle relative to the longitudinal direction of the first long hole, and can be attached to the attachment receiving member in an extremely easy one-touch operation. Further, when a plurality of pedestal portions is provided to the attachment member, after the attachment member is attached to the attachment receiving member, the positional deviation relative to the attachment receiving member and rattling of the attachment member due to impact force externally exerted to the attachment member can be assuredly prevented.

Further, the first long hole of the attachment receiving member into which the positioning boss is fitted is formed in a direction at substantially right angle relative to the longitudinal direction of the cutaway groove portion of the pedestal portion. At the same time, the width of the second long hole of the attachment receiving member into which the fitting head portion of the clip is substantially equal to the width of the fitting head portion. Therefore, after the positioning boss is fitted to the first long hole, the movement of the clip in the longitudinal direction of the cutaway groove portion, that is, the positional deviation in the direction orthogonal to the longitudinal direction of the second long hole of the attachment receiving member can be prevented. That is, the positional deviation relative to the attachment member and rattling of the clip due to impact force exerted after the attachment member is attached to the attachment receiving member can be prevented.

Further, a pair of contact portions extended upward to a predetermined height at substantially right angle from the opposite edge portions of the flat plate portion of the clip in a direction at substantially right angle relative to the longitudinal direction of the cutaway groove portion is brought into contact with the attachment receiving member. At the same time, a pair of elastic locking pieces of the clip is elastically locked with the periphery of each longer side portion of the second long hole of the attachment receiving member. Thus, the attachment receiving member is pinched between the pair of contact portions and the pair of elastic locking pieces, and the clip can be assuredly prevented from rattling.

Further, according to the clip of the present invention, if the attachment member includes a rib portion provided in an upright posture on the outside of the side surface portion of the upper wall of the pedestal portion, and an extending portion elastically deformable downward and extending substantially vertically from the rib portion at the height opposing to the flange portion up to the inlet portion of the cutaway groove portion, when the flange portion moves while depressing the extending portion downward and the boss portion is fitted to the cutaway groove, the flange portion opposes to the extending portion extending up to the inlet portion of the cutaway groove portion. Due to this structure, the clip can be assuredly prevented from slipping off due to the impact force externally exerted during when the attachment member is transferred after the clip is attached to the pedestal portion.

Further, according to the clip of the present invention, if the locked state between the second long hole of the attachment receiving member and a pair of elastic locking pieces of the clip is releasable by inserting a tool through the tool hole into the recessed portion of the clip and rotating by 90 degrees counterclockwise, the attachment member can be detached from the attachment receiving member in an extremely easy operation as is the case of screw cramp.

Further, according to the clip of the present invention, there is provided a flat plate-like water-proof elastic member formed with a through hole having a substantially square shape when seen from above. The through hole is fitted to the fitting head portion to bring the flat plate-like water-proof elastic member into contact with the upper surface of the flat plate portion. The water-proof elastic member may have a thickness which is larger than the height of a pair of contact portions extending to a predetermined height upward at substantially right angle from the opposite edge portions of the flat plate portion in a direction at substantially right angle relative to the longitudinal direction of the cutaway groove portion, and which also enables the water-proof elastic member to be locked with a pair of elastic locking pieces.

In this case, a pair of contact portions is brought into contact with the attachment receiving member, and a pair of elastic locking pieces is elastically locked with the periphery of each longer side portion of the second long hole of the attachment receiving member. As a result, the water-proof elastic member is compressed in the thickness direction and is pinched between the flat plate portion and the attachment receiving member. Thus, the second long hole can be assuredly waterproof.

Figure 1:
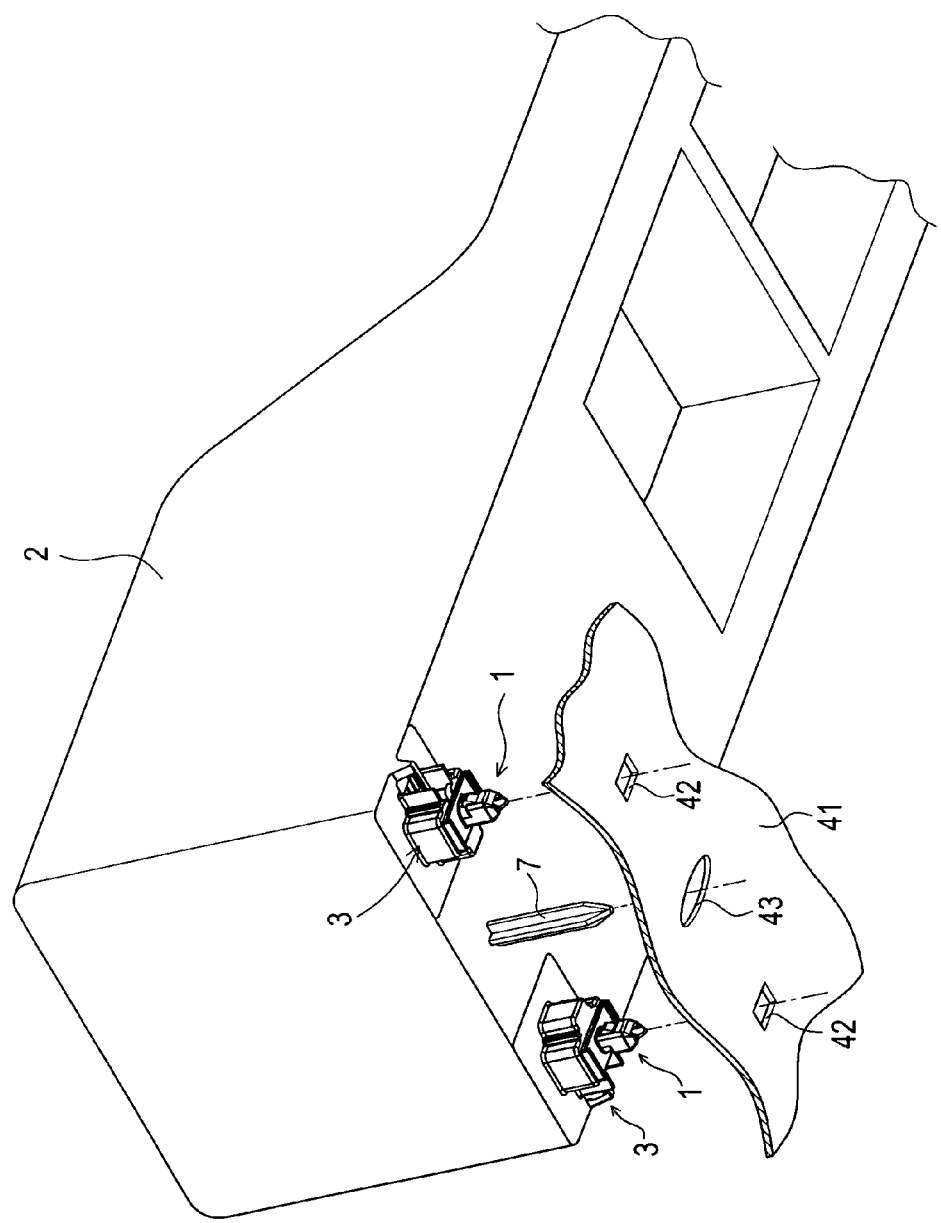
FIG. 1 is a perspective view schematically showing a clip according to this embodiment, an assembling portion of a console box to which the clip is assembled, and each long hole of the attachment receiving member with which the clip is locked.

EXPLANATION OF REFERENCES 1 clip
2 console box
3 assembling portion
5 pedestal portion
5A upper wall
6 cutaway groove portion
8 tool hole
16 rib portion
17 extending portion
21 flat plane portion
21A contact portion
22 boss portion 24 flange portion
26 recessed portion
28 fitting head portion
31 elastic locking pieces
41 attachment receiving member
42, 43 long holes
51 water-proof elastic member
100 tool

BEST MODE FOR CARRYING OUT THE INVENTION

Hereinafter, a clip according to the present invention will be described in detail with reference to the drawings based on an embodiment which has embodied the present invention. First, an entire structure related to a clip according to this embodiment, an assembling portion of the console box as an attachment member to which the clip is assembled, and each long hole of the attachment receiving member composed of a metal plate (body) to constitute an automobile body with which the clip is locked is described based on FIG. 1.

FIG. 1 is a perspective view schematically showing a clip according to this embodiment, an assembling portion of a console box to which the clip is assembled, and each long hole of the attachment receiving member with which the clip is locked.

As shown in FIG. 1, the clip 1 is assembled to each of a pair of assembling portion 3 provided on the left and right corner portions at the front side on the bottom surface portion of the console box 2. On the bottom surface portion of the console box 2 substantially at the midportion between the assembling portions 3, a positioning boss 7 having a cross shape in cross section (see FIG. 29) is protruded further downward than each clip 1 in an upright posture (see FIG. 27). Further, as will be described later, an attachment receiving member 41 which is a metal plate (body) to constitute an automobile body is formed with a pair of long holes (second long holes) 42 into which each clip 1 is fitted. At the midportion between the long holes 42, a long hole 43 (a first long hole) into which the positioning boss 7 is fitted is penetratively formed.

Here, first of all, a schematic structure of the assembling portions 3 of the console box 2 will be described based on FIGS. 2 to 8. Since all of the assembling portions 3 of the console box 2 are in the same structure, a schematic structure of the assembling portion 3 at the right side in FIG. 1 will be hereinafter described.

Figure 2:
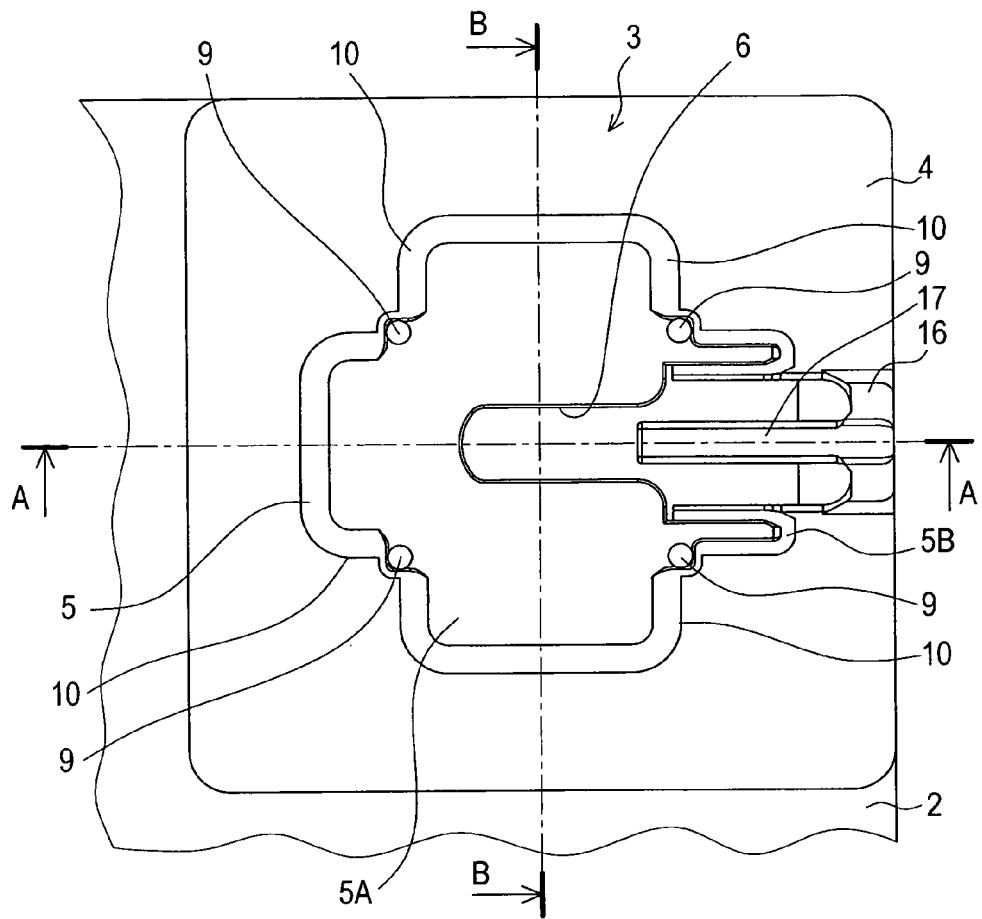
FIG. 2 is a plan view showing the assembling portion of the console box.
Figure 3:
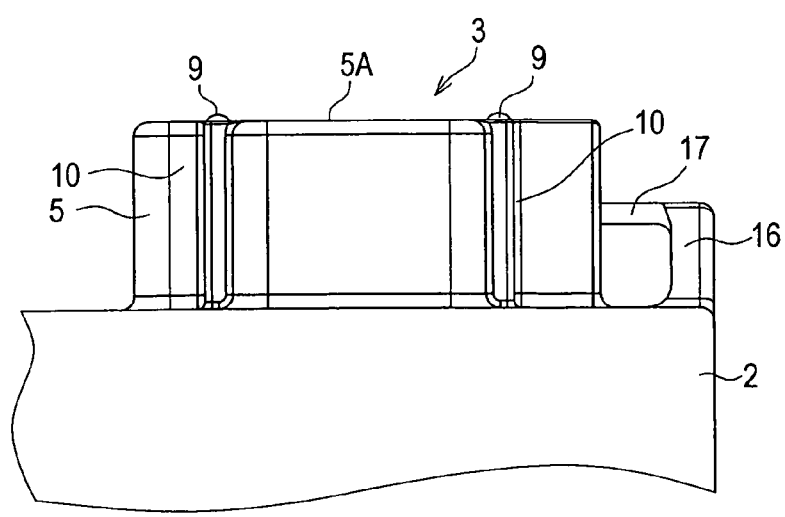
FIG. 3 is a front view showing the assembling portion of the console box.
Figure 4:
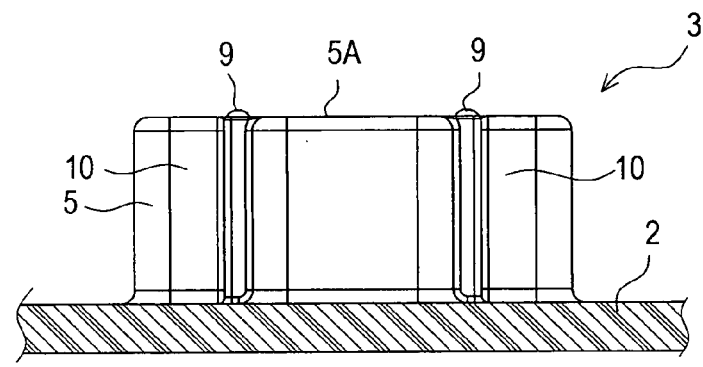
FIG. 4 is a left side view showing the assembling portion of the console box.
Figure 5:
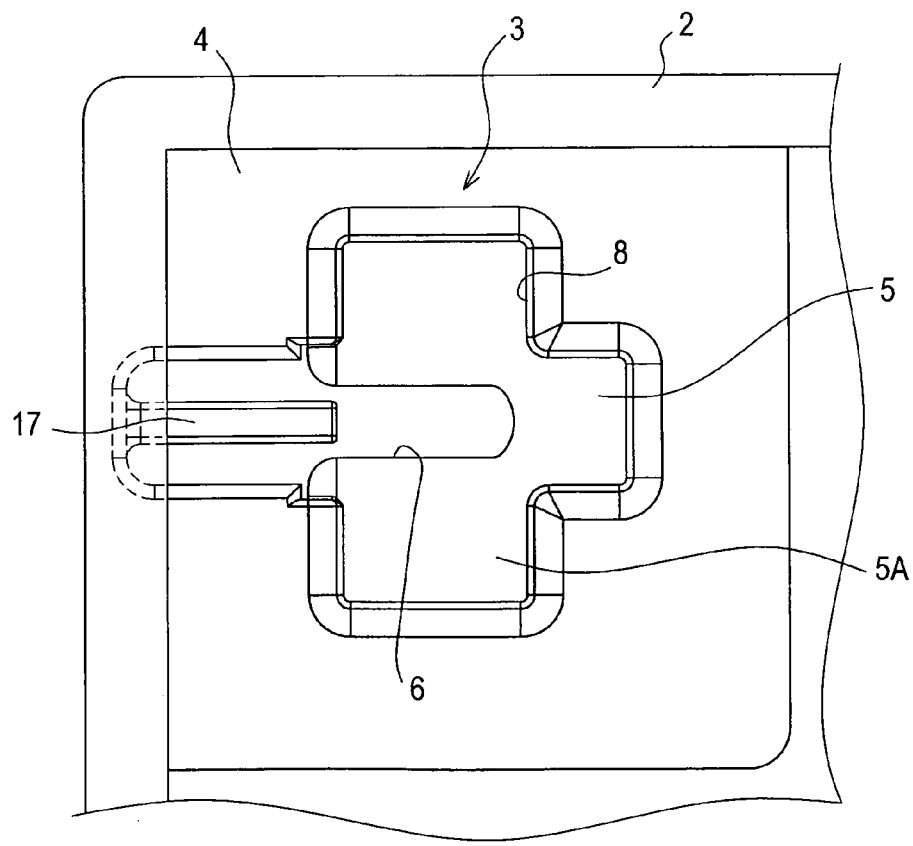
FIG. 5 is a bottom view showing the assembling portion of the console box.
Figure 6:
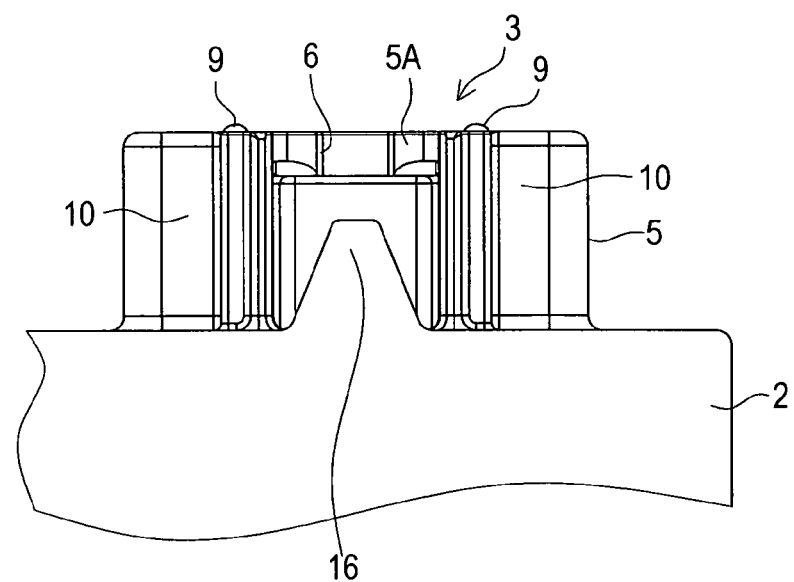
FIG. 6 is a right side view showing the assembling portion of the console box.
Figure 7:
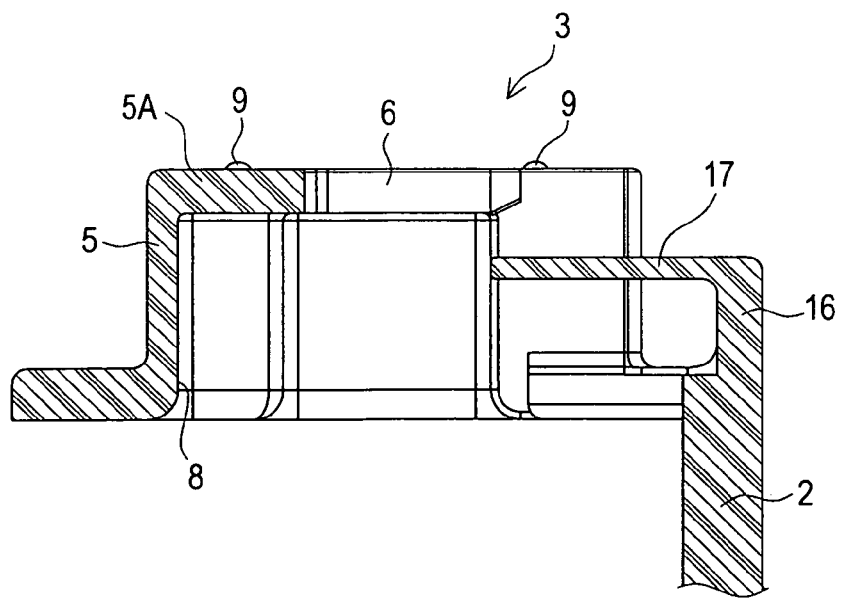
FIG. 7 is a cross-sectional view taken along the arrow A-A of FIG. 2.
Figure 8:
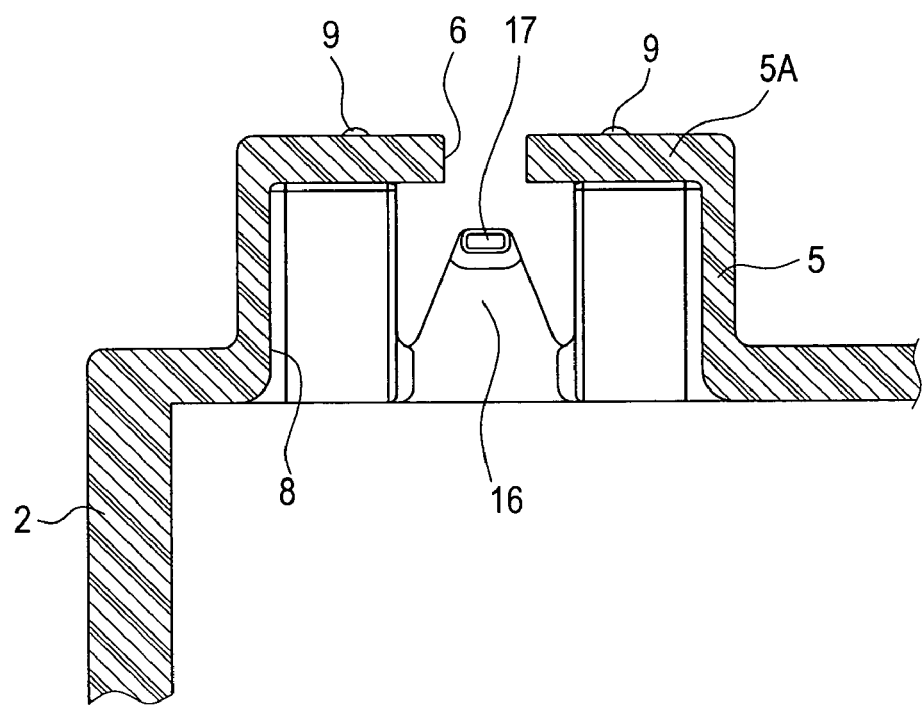
FIG. 8 is a cross-sectional view taken along the arrow B-B of FIG. 2.

FIG. 2 is a plan view showing the assembling portion 3 of the console box 2. FIG. 3 is a front view showing the assembling portion 3 of the console box 2. FIG. 4 is a left side view showing the assembling portion 3 of the console box 2. FIG. 5 is a bottom view showing the assembling portion 3 of the console box 2. FIG. 6 is a right side view showing the assembling portion 3 of the console box 2. FIG. 7 is a cross-sectional view taken along the arrow A-A of FIG. 2. FIG. 8 is a cross-sectional view taken along the arrow B-B of FIG. 2.

Here, in FIGS. 1 to 8, the assembling portion 3 of the console box 2 is made of one of various resins, for example, polypropylene or middle to high shock resistant nylon referred to as "super tough nylon" and is integrally molded with the console box 2.

As shown in FIGS. 2 to 8, the assembling portion 3 is provided on one surface of the console box 2 (in FIG. 1, on the bottom surface of the console box 2), and has a base end portion 4 integrally molded with the console box 2 by one of various molding methods.

The base end portion 4 has a pedestal portion 5 bulging upward substantially into the shape of the downward-opened square bracket when seen from side. The pedestal portion 5 is formed with a recessed portion 10 at each of its four corners recessed inward substantially into the shape of rectangle when seen from above. The middle portion of an upper wall 5A and a side surface portion 5B on the outside of the pedestal portion 5 (at the right side in FIG. 2) are cut away inward from the side surface portion 5B along the total height of the pedestal portion 5 so as to form a cutaway groove portion 6 extending horizontally when seen from above. An inlet portion of the cutaway groove 6 is formed into the width slightly larger than the middle portion of the upper wall 5A up to the position opposing to the respective recessed portion 10 on the outside (at the right side in FIG. 2). The longitudinal width of the cutaway groove portion 6 of the upper wall 5A and the width of the cutaway groove portion 6 in the direction at substantially right angle relative to its longitudinal direction are formed to be substantially equal to the longitudinal width of a flat plate portion 21 of the clip 1 which will be described later.

The inner upper surface portion of the respective recessed portion 10 of the upper wall 5A is formed with four protruding portions 9 at the four corners when seen from front each having a substantially semispherical shape and each protruding into a predetermined height (in this embodiment, into a height of approximately 0.3 to 0.6 mm). Due to this structure, when the clip 1 is turned by approximately 90 degrees counterclockwise, the side surface of the flat plane portion 21 is brought into contact with each protruding portion 9 and is held at the rotated position (see FIG. 30).

Further, a tool hole 8 is penetratively formed in the base end portion 4 opposing to the upper wall 5A of the pedestal portion 5 and a portion of the base end portion 4 in a predetermined length (for example, about 3 to 5 mm) outward from the inlet portion of the cutaway groove portion 6 of the pedestal portion 5.

At the edge portion (at the right edge portion in FIG. 2) of the tool hole 8 penetratively formed in the base end portion 4 opposing to the inlet portion of the cutaway groove portion 6, a rib portion 16 having a trapezoidal shape when seen from front is provided in an upright posture to the height opposing to a flange portion 24 (see FIG. 10) formed on the lower end portion of the clip 1 when the clip 1 is assembled to the pedestal portion 5. Further, an extending portion 17 elastically deformable in the downward direction extends from the upper end portion of the rib portion 16 to the position opposing to respective recessed portion 10 at a position substantially vertically inward of the inlet portion of the cutaway groove portion 6. Thus, when the clip 1 is assembled to the pedestal portion 5, the flange portion 24 of the clip 1 will oppose to the top end portion of the extending portion 17 as will be described later (see FIG. 23).

Next, a schematic structure of the clip 1 will be described based on FIGS. 9 to 16.

Figure 9:
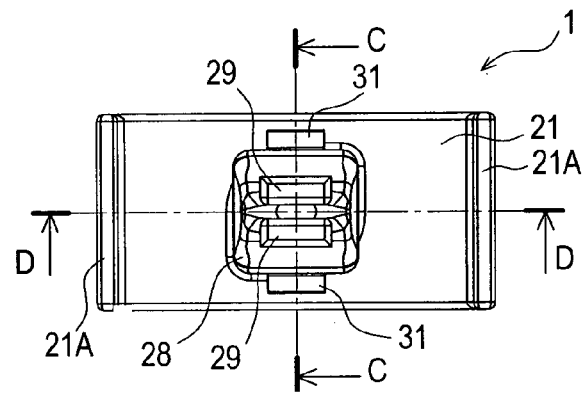
FIG. 9 is a plan view showing the clip.
Figure 10:
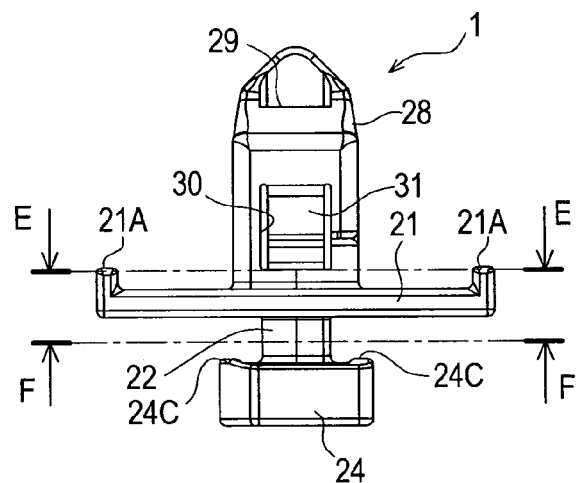
FIG. 10 is a front view showing the clip.
Figure 11:
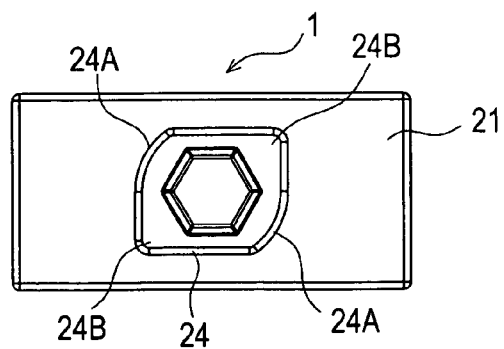
FIG. 11 is a bottom view showing the clip.
Figure 12:
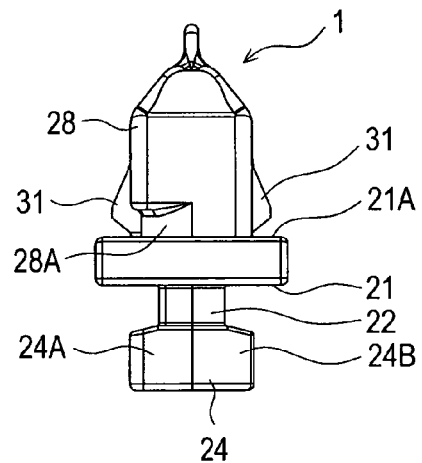
FIG. 12 is a right side view showing the clip.
Figure 13:
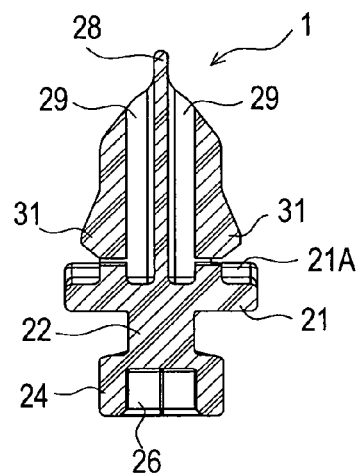
FIG. 13 is a cross-sectional view taken along the arrow C-C of FIG. 9.
Figure 14:
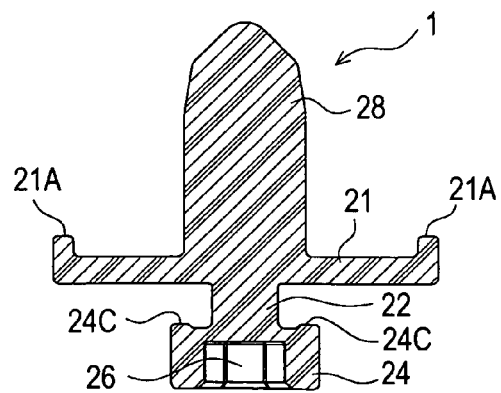
FIG. 14 is a cross-sectional view taken along the arrow D-D of FIG. 9.
Figure 15:
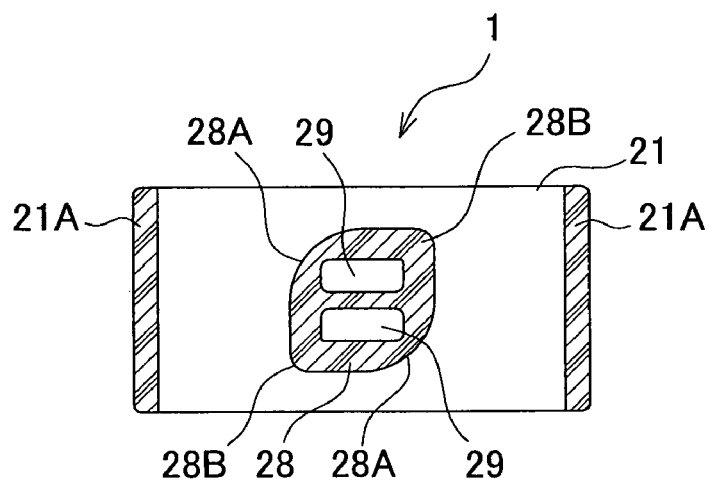
FIG. 15 is a cross-sectional view taken along the arrow E-E of FIG. 10.
Figure 16:
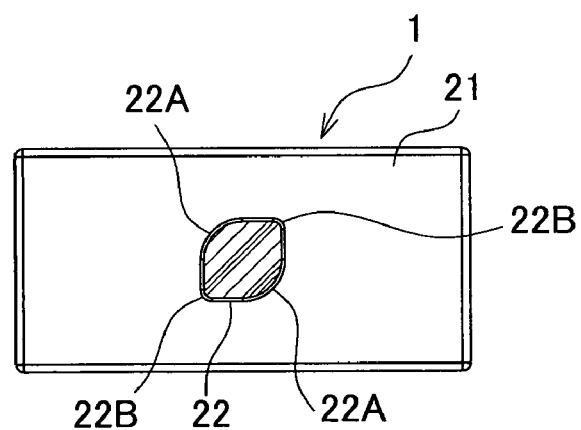
FIG. 16 is a cross-sectional view taken along the arrow F-F of FIG. 10.

FIG. 9 is a plan view showing the clip 1. FIG. 10 is a front view showing the clip 1. FIG. 11 is a bottom view showing the clip 1. FIG. 12 is a right side view showing the clip 1. FIG. 13 is a cross-sectional view taken along the arrow C-C of FIG. 9. FIG. 14 is a cross-sectional view taken along the arrow D-D of FIG. 9. FIG. 15 is a cross-sectional view taken along the arrow E-E of FIG. 10. FIG. 16 is a cross-sectional view taken along the arrow F-F of FIG. 10.

Here, the clip 1 is integrally molded from one of various resins, for example, polypropylene or middle to high shock resistant nylon referred to as "super tough nylon".

As shown in FIGS. 9 to 16, the clip 1 has a flat plate portion 21 having a substantially rectangular shape when seen from above of which bottom surface (the lower end surface in FIG.

Figure 21:
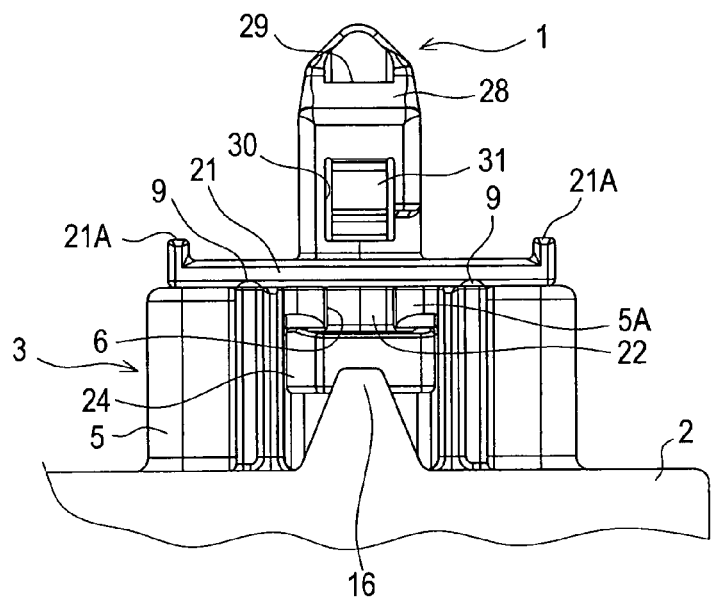
FIG. 21 is a right side view for illustrating a state where clip is assembled to the assembling portion.

10) will be brought into contact with the upper surface portion of the upper wall 5A of the pedestal portion 5 (see FIG. 21 and the like). From the center portion on the bottom surface of the flat plane portion 21, a boss portion 22 is vertically extended downward.

Figure 19:
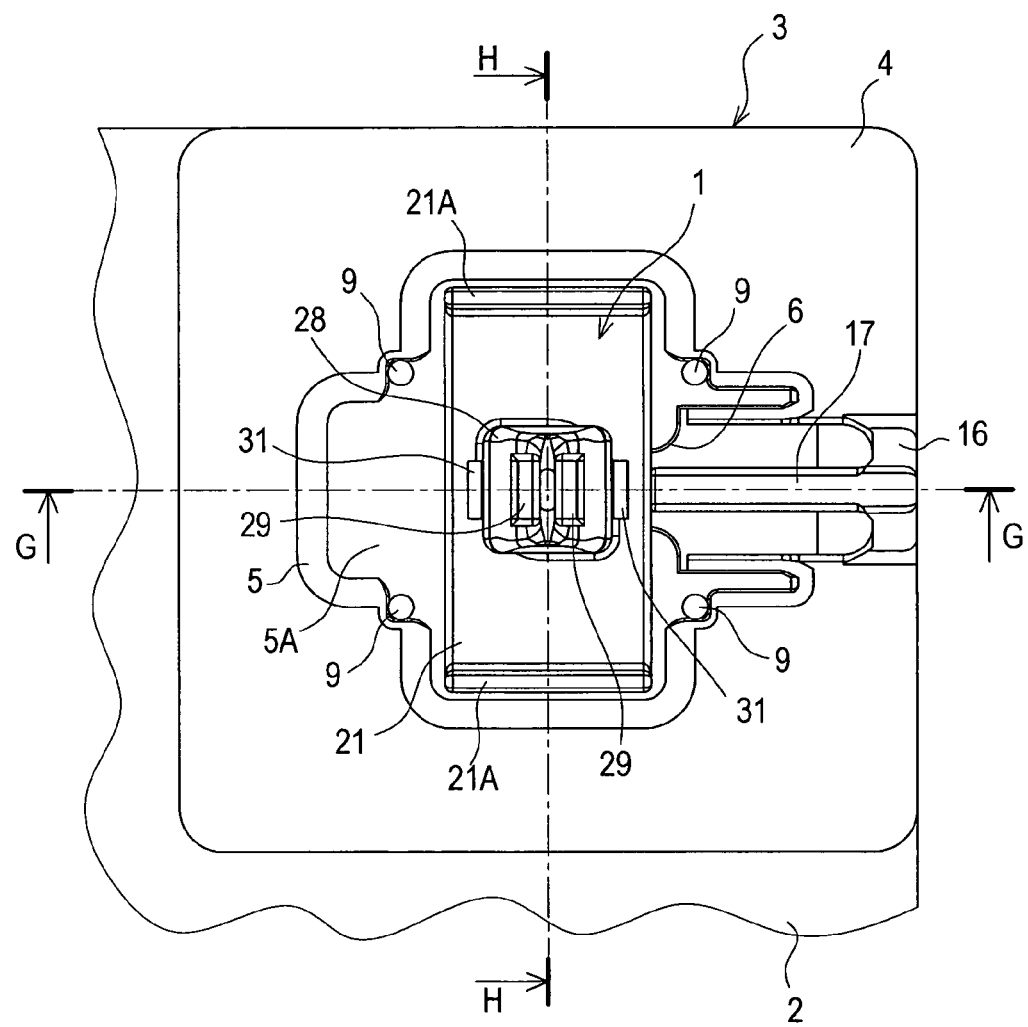
FIG. 19 is a plan view for illustrating a state where the clip is assembled to the assembling portion.

When the clip 1 is attached to the pedestal portion 5, the longitudinal direction of the flat plate portion 21 when seen from above is oriented to be in a direction at substantially right angle relative to the longitudinal direction of the cutaway groove portion 6 of the upper wall 5A of the pedestal portion 5, and simultaneously, the width of the longer side of the flat plate portion 21 when seen from above is substantially equal to the width in a direction at substantially right angle relative to the longitudinal direction of the cutaway groove portion 6 of the upper wall 5A of the pedestal portion 5 (see FIG. 19). Further, the flat plate portion 21 is also constituted in such a manner that the width of the shorter side thereof when seen from above is smaller than the distance between the protruding portions 9 so that the clip 1 can be slidable across a predetermined width along the cutaway groove portion 6 (see FIGS. 19 and 23). Further, at the opposite edge portions of the flat plate portion 21 in its longitudinal direction when seen from above, contact portions 21A, 21A to be in contact with the attachment receiving member 41 as will be described later are respectively extended vertically upward across the entire width of each edge portion into a predetermined height (for example, into a height of about 2 mm to 4 mm) (see the left drawing in FIG. 30).

Figure 23:
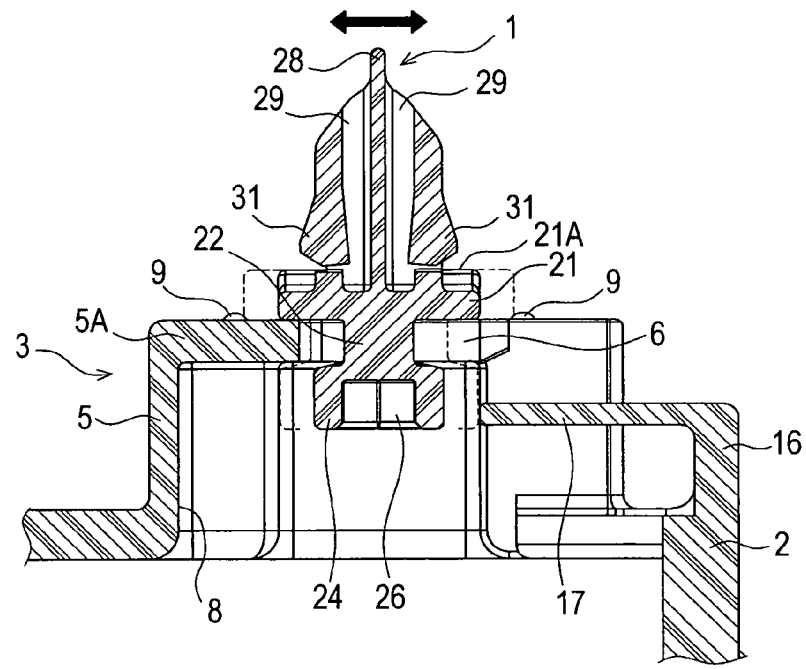
FIG. 23 is a cross-sectional view taken along the arrow G-G of FIG. 19.

Further, the height of the boss portion 22 is substantially equal to the thickness of the upper wall 5A (see FIG. 23).

Further, as shown in FIG. 16, the cross section of the boss portion 22 vertical to its axial direction assumes a substantially square shape as a whole whose side is substantially equal to the width at the depth side of the cutaway groove portion 6 formed on the upper wall 5A. A pair of opposing corners of the square creates a circular arc 22A having a diameter substantially equal to the width of the cutaway groove portion 6, whereas the other pair of opposing corners thereof creates a corner portion 22B at substantially right angle.

At the lower end portion of the boss 22 (the lower end portion in FIG. 10), a flat plate-like flange portion 24 (see FIG. 10 and the like) having a substantially rectangular shape when seen from above with a predetermined thickness (in this embodiment, approximately 4 mm to 6 mm in thickness) is formed to protrude outward around the lower end portion of the boss portion 22 into a predetermined length (in this embodiment, approximately 1.5 mm to 3 mm).

Further, as shown in FIG. 11, the flange portion 24 is formed into a substantially square shape as a whole when seen from above. A pair of opposing corners of the square creates a circular arc 24A having a diameter substantially equal to the width, whereas the other pair of opposing corners thereof creates a corner portion 24B at substantially right angle.

At the left and right (left and right portions in FIG. 10) opposite outer edge portions of the flange portion 24 in a direction at substantially right angle relative to the longitudinal direction of the cutaway groove portion 6 to be opposed to the bottom surface of the flat plate portion 21, contact rib portions 24C are provided in an upright posture to such a predetermined height (in this embodiment, in a height of about 0.3 mm to 0.5 mm) as to be in contact with the lower surface portion of the upper wall 5A of the pedestal portion 5. Due to this structure, when the boss portion 22 is slipped into the cutaway groove portion 6 of the pedestal portion 5, the upper wall 5A is pinched between the bottom surface of the flat plate portion 21 and the upper end surface portion of the respective contact rib portion 24C so that the clip 1 is assembled to the pedestal portion 5 and the clip 1 is made slidable along the cutaway groove portion 6 (FIG. 23).

Further, as shown in FIGS. 11, 13, and 14, at the midportion of the lower end of the flange portion 24 (the lower end portion in FIG. 10), a recessed portion 26 in a substantially hexagonal shape in a horizontal cross section having a depth substantially equal to the thickness of the flange portion 24 is formed so that a tool 100 such as a hexagonal wrench can be fitted as will be described later (see FIG. 30).

At the midportion on the upper surface of the flat plate portion 21, a fitting head portion 28 to be fitted to a long hole (a second long hole) 42 having a substantially rectangular shape of the attachment receiving member 41 as will be described later is provided in an upright posture. The fitting head portion 28 is formed into a substantially square shape when seen from above as a whole having sides of the same width as of the shorter side of the long hole 42 (see FIG. 9). In addition, left and right side surfaces (left and right side surface portions in FIG. 9) of the fitting head portion 28 are placed along the longitudinal direction of the cutaway groove portion 6 when the clip 1 is attached to the pedestal portion 5. Further, the upper end portion of the fitting head portion 28 is formed into a tapered shape when seen from side (see FIG. 12).

Further, as shown in FIGS. 9 and 13, hole portions 29, 29 in a rectangular shape long in left and right directions in a horizontal cross section are formed in the upper end surface portion of the fitting head portion 28 to a depth reaching the upper surface portion of the flat plate portion 21 in such a manner that the respective hole portions 29, 29 are placed along the longitudinal direction of the cutaway groove portion 6 when the clip is attached to the pedestal portion 5. On the frontward and rearward (upward and downward in FIG. 9) side surface portions of the fitting head portion 28 opposing to the respective hole portions 29, 29, through holes 30, 30 each having a substantially longitudinally long rectangular shape are penetratively formed. Then, a pair of elastic locking pieces 31 which are elastically deformable inward is provided to extend downward from the upper edge portions of the through holes 30, 30. The respective elastic locking pieces 31, 31 are formed into a substantially longitudinally long rectangular shape when seen from front, and as shown in FIG. 13, the lower end portion thereof protrudes into a substantially triangular shape in a side cross section. Further, as will be described later, the height of the respective elastic locking pieces 31, 31 from the lower end portion to the flat plate portion 21 is arranged to be slightly smaller than the sum of the height from the upper surface portion of the flat plate portion 21 to the upper end portion of the respective contact portions 21A and the thickness of the attachment receiving member 41 (see the left drawing in FIG. 30). Due to this arrangement, when the clip 1 is fitted into the long hole (second hole) 42 of the attachment receiving member 41 as will be described later, the respective longer side portions of the long hole 42 are assuredly brought into contact with the lower end portions of the respective elastic locking pieces 31, 31 which are inclined obliquely inward, so that the respective elastic locking pieces 31, 31 are elastically locked with the longer side portions of the long hole 42 (see the left drawing in FIG. 30).

Further, as shown in FIG. 15, the fitting head portion 28 is formed into a substantially square shape as a whole in cross section any vertical from each protruding portion of the respective elastic locking pieces 31, 31 protruding outward to the to flat plate portion 21. Each side of the square has a width substantially same as of the shorter side of the long hole 42 of the attachment receiving member 41. A pair of opposing corners of the square creates a circular arc 28A having a diameter substantially equal to the width of the shorter side of the long hole 42, whereas the other pair of opposing corners thereof creates a corner portion 28B at substantially right angle.

Due to this arrangement, as will be described later, when the clip 1 is fitted into the long hole 42 of the attachment receiving member 41 and the clip 1 is rotated while it is attached to the pedestal portion 5, the clip 1 can be rotated only in a direction shown with an arrow X10 in FIG. 30, that is, only in a direction along which the tool 100 is rotated counterclockwise (see FIG. 30), because of the axially vertical cross sectional shape of the base end portion of the fitting head portion 28. Further, the base end portion of the fitting head portion 28 is structured to be capable of rotating only by 90 degrees counterclockwise within the long hole 42.

Subsequently, a method of assembling the thus-structured clip 1 to the assembling portion 3 of the console box 2 will be described based on FIGS. 17 to 24.

Figure 17:
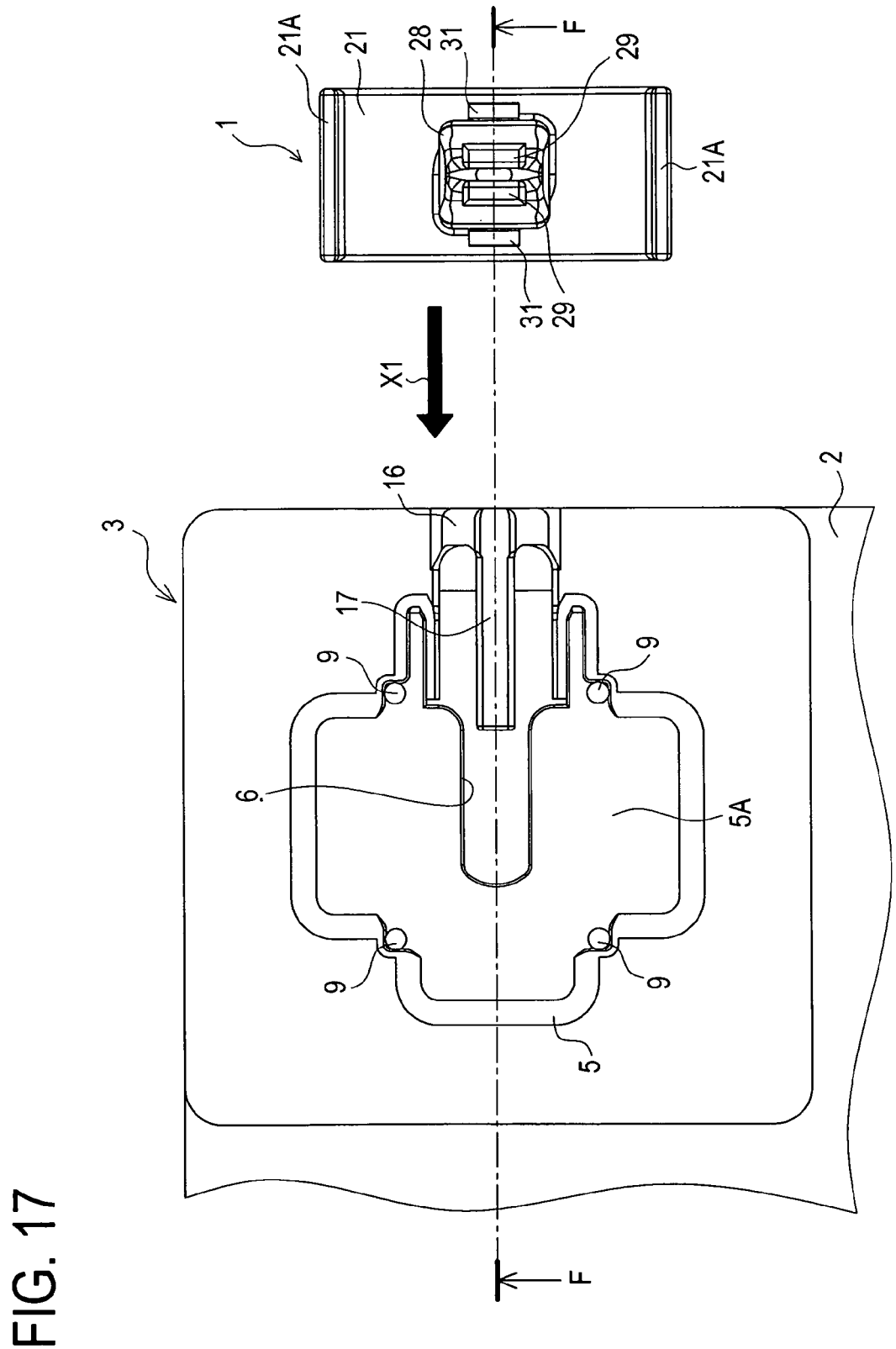
FIG. 17 is a plan view for illustrating a process of assembling the clip to the assembling portion.
Figure 18:
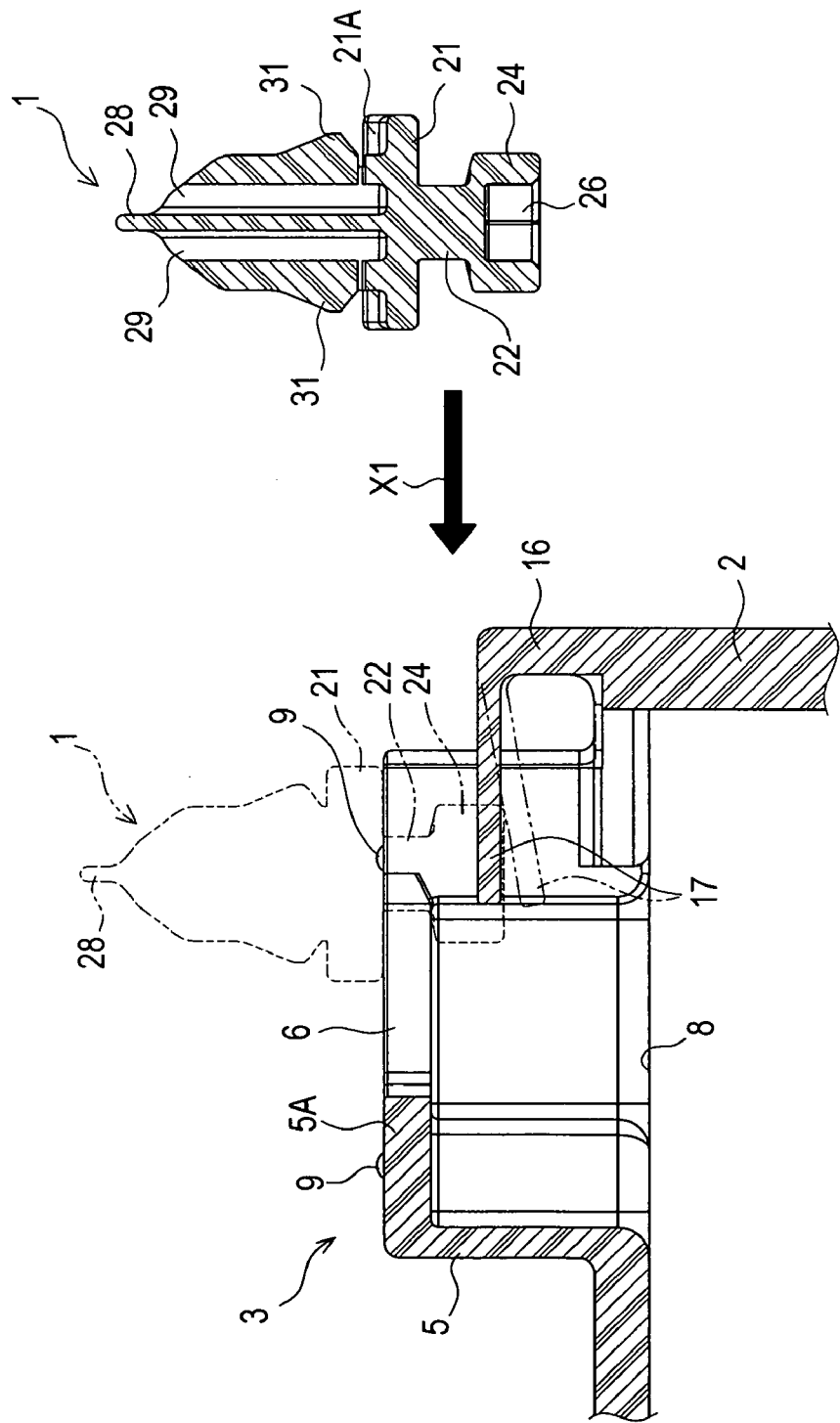
FIG. 18 is a cross-sectional view taken along the arrow F-F in a midway of assembling process of FIG. 17.
Figure 20:
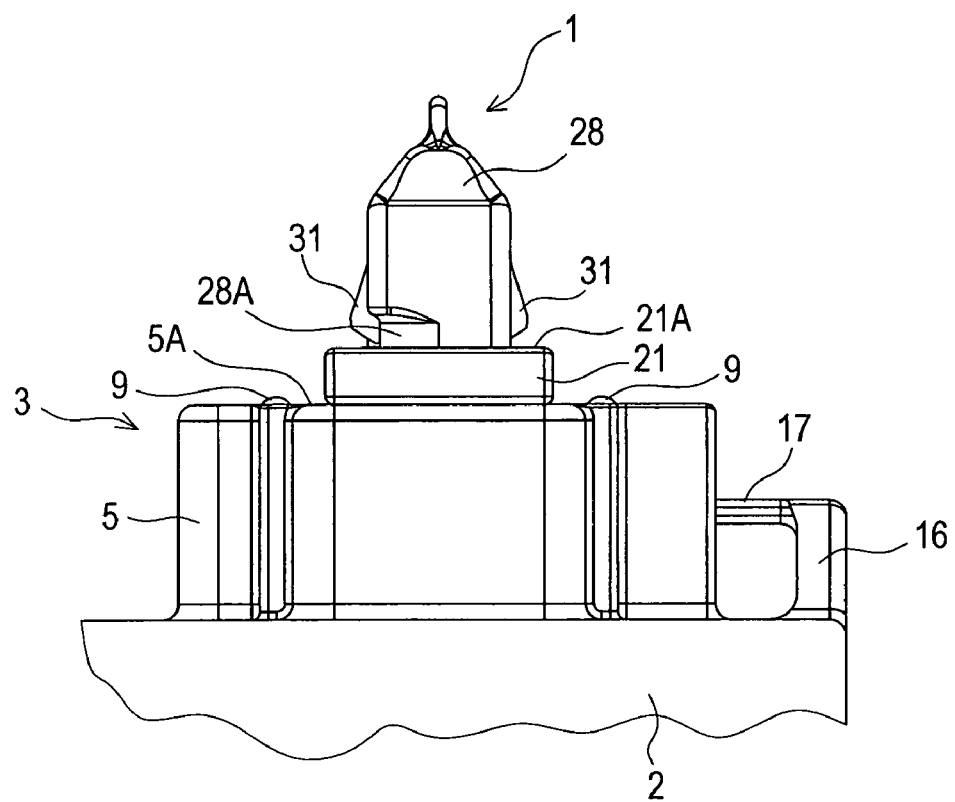
FIG. 20 is a front view for illustrating a state where the clip is assembled to the assembling portion.
Figure 22:
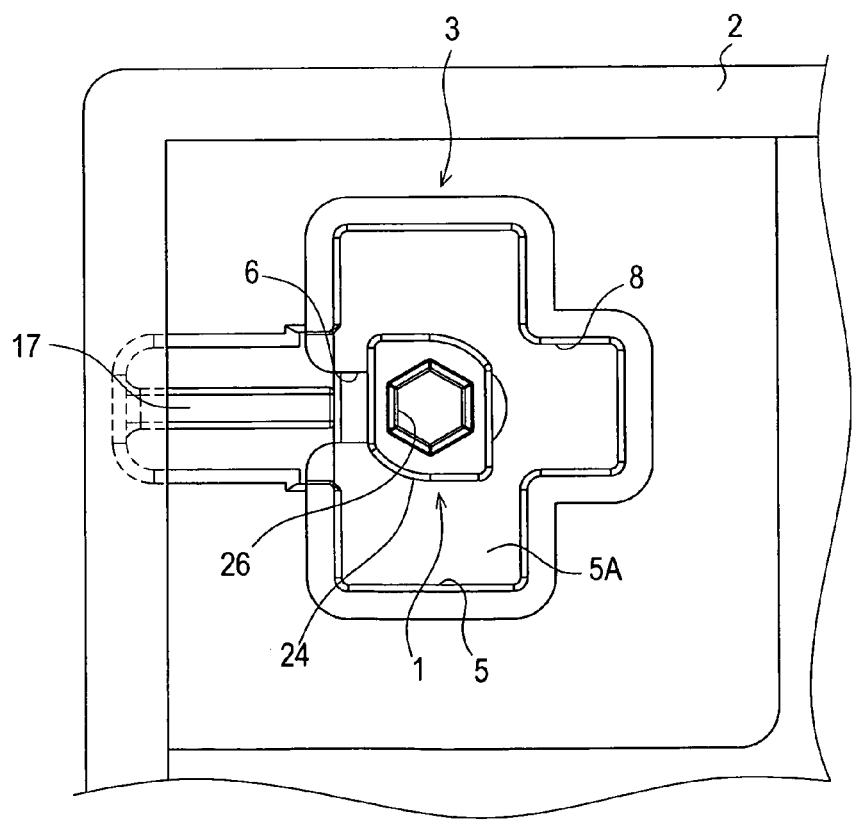
FIG. 22 is a bottom view for illustrating a state where the clip is assembled to the assembling portion.
Figure 24:
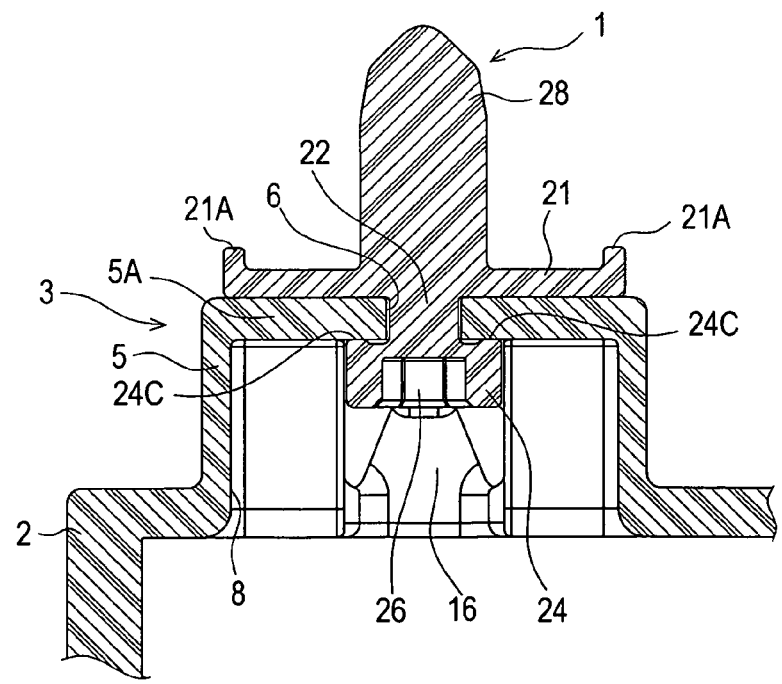
FIG. 24 is a cross-sectional view taken along the arrow H-H of FIG. 19.

FIG. 17 is a plan view for illustrating a process of assembling the clip 1 to the assembling portion 3. FIG. 18 is a cross-sectional view taken along the arrow F-F in a midway of assembling process of FIG. 17. FIG. 19 is a plan view for illustrating a state where the clip 1 is assembled to the assembling portion 3. FIG. 20 is a front view for illustrating a state where the clip 1 is assembled to the assembling portion 3. FIG. 21 is a right side view for illustrating a state where clip 1 is assembled to the assembling portion 3. FIG. 22 is a bottom view for illustrating a state where the clip 1 is assembled to the assembling portion 3. FIG. 23 is a cross-sectional view taken along the arrow G-G of FIG. 19. FIG. 24 is a cross-sectional view taken along the arrow H-H of FIG. 19.

As shown in FIGS. 17 and 18, the clip 1 is moved in the direction of an arrow X1 in such a manner that the longitudinal direction of the flat plate portion 21 when seen from above is at substantially right angle relative to the longitudinal direction of the cutaway groove portion 6, that is, the respective elastic locking pieces 31, 31 are placed along the longitudinal direction of the cutaway groove portion 6.

Then, the lower end portion of the flange portion 24 of the clip 1 is brought into contact with the extending portion 17 provided on the base end portion 4. While depressing the extending portion 17 downward, the clip 1 is moved in the direction along the arrow X1 with the lower end surface of the flat plate portion 21 of the clip 1 brought into contact with the upper end surface of the upper wall 5A of the pedestal portion 5, so that the boss portion 22 is slipped into the cutaway groove portion 6 of the pedestal portion 5.

Further, as shown in FIGS. 19 to 24, as the clip 1 is further pushed in the direction of the arrow X1, the flange portion 24 is distanced from the top end portion of the extending portion 17, and the upper wall 5A is pinched between the bottom surface of the flat plate portion 21 and the respective contact rib portions 24C of the flange portion 24. When the flat plate portion 21 advances beyond the respective protruding portions 9 protruded at the inlet side of the cutaway groove portion 6, the bottom surface portion of the flat plate portion 21 is brought into contact with the upper wall 5A. As a result, the clip 1 becomes slidable along the cutaway groove portion 6 by a predetermined width between the respective protruding portions 9. Since the flange portion 24 of the clip 1 opposes to the top end portion of the extending portion 17, when the boss portion 22 moves to reach the inlet portion of the cutaway groove portion 6, the flange portion 24 comes into contact with the top end portion of the extending portion 17 (see FIG. 23). As a result, the clip 1 is prevented from slipping off the pedestal portion 5. In this manner, the clip 1 can be always kept slidable along the cutaway groove portion 6, and simultaneously, the clip 1 can be always integrally handled with the assembling portion 3 of the console box 2 to which the clip 1 is assembled.

Here, the long hole 42 (second long hole) of the attachment receiving member 41 which is a metal plate (body) to constitute an automobile body and to which the clip 1 is locked, and the long hole 43 (first long hole) to which the positioning boss 7 provided on the bottom surface portion of the console box 2 in an upright posture is fitted will be described based on FIGS. 25 and 26.

Figure 25:
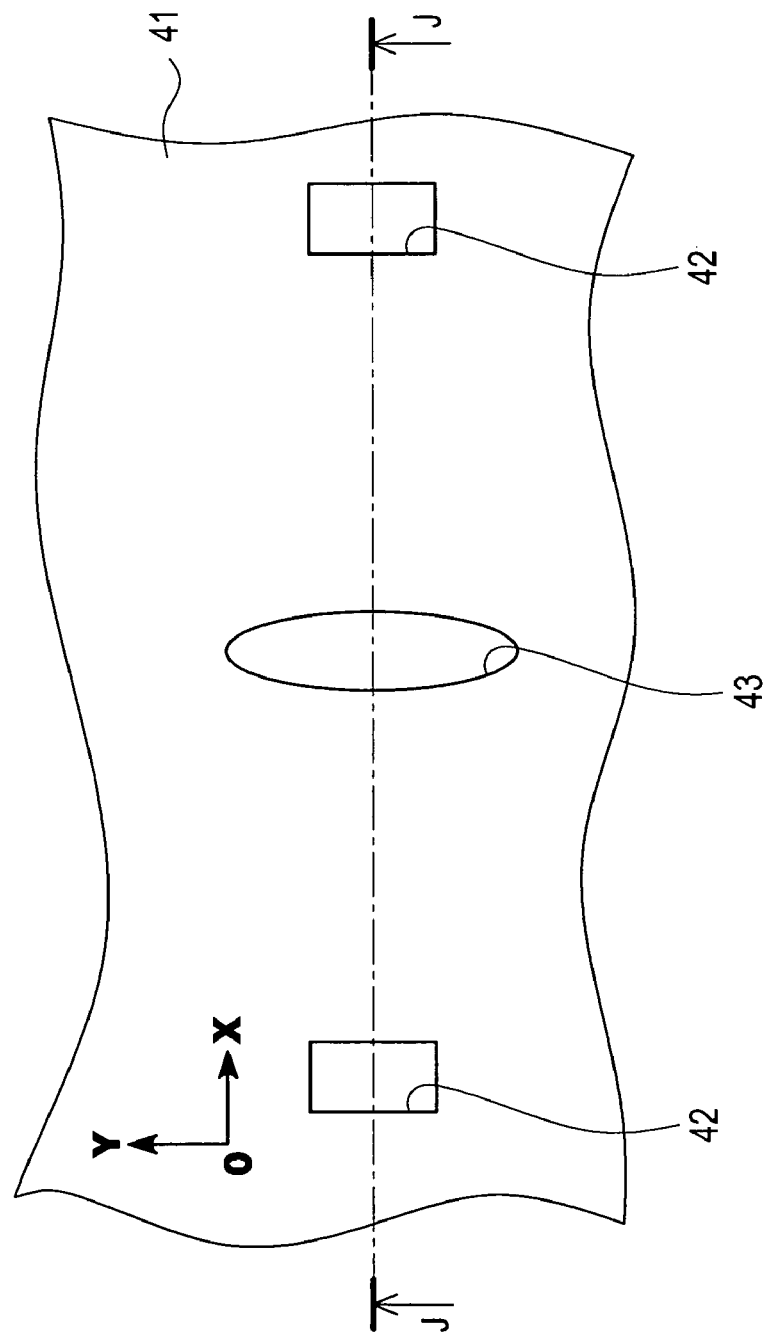
FIG. 25 is a plan view showing the long holes of the attachment receiving member to which the clip is locked and the long hole to which the positioning boss provided on the bottom surface portion of the console box in an upright posture is fitted.

FIG. 25 is a plan view showing the long holes 42 of the attachment receiving member 41 to which the clip 1 is locked and the long hole 43 (first long hole) to which the positioning boss 7 provided on the bottom surface portion of the console box 2 in an upright posture is fitted. FIG. 26 is a cross-sectional view taken along the arrow J-J of FIG. 25.

Figure 26:
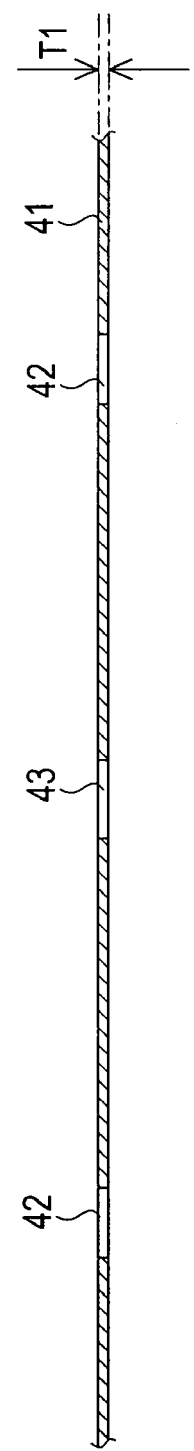
FIG. 26 is a cross-sectional view taken along the arrow J-J of FIG. 25.

As shown in FIGS. 25 and 26, each long hole 42 (second long hole) having a substantially longitudinal rectangular shape when seen from above to which the clip 1 is locked is penetratively formed in the attachment receiving member 41 having a thickness T1 (in this embodiment, T1 is approximately 0.8 mm to 2 mm) so as to be opposed to each assembling portion 3. At the midway position between the long holes 42, a long hole 43 (first long hole) having a longitudinal oval shape when seen from above and being parallel to each long hole 42 is penetratively formed so as to be opposed to the positioning boss 7 provided in an upright posture on the bottom surface portion of the console box 2.

The shorter diameter of the long hole 43 is arranged to be substantially equal to the maximum width of the axially vertical cross section of the positioning boss 7. Due to this structure, when the positioning boss 7 is fittingly inserted into the long hole 43, the positioning boss 7 is positioned at a substantially midway position in the longer diameter direction of the long hole 43, that is, the widthwise position of the console box 2 (X direction in FIG. 25) is fixed relative to the attachment receiving member 41.

Further, the long holes 42, 43 are penetratively formed in such a manner that their respective longitudinal direction (Y direction in FIG. 25) is placed along a direction at substantially right angle relative to the longitudinal direction of the cutaway groove portion 6 formed on the upper wall 5A of the respective pedestal portion 5 of the console box 2. Further, the width along the longitudinal direction (Y direction in FIG. 25) of the respective long hole 42 is formed to be larger than the distance between the outward protruding end portions of the elastic locking pieces 31, 31 of the clip 1. Thus, each long hole 42 is formed into a width that allows the elastic locking pieces 31, 31 to pass through the long hole 42 when the clip 1 is rotated by 90 degrees counterclockwise and is withdrawn from the long hole 42 as will be described later (see FIG. 31). In this manner, the positional deviation in the Y direction between the clip 1 assembled to the assembling portion 3 of the console box 2 and the attachment receiving member 41 is absorbed.

Further, the width of each long hole 42 in a direction at right angle relative to the longitudinal direction thereof, that is, the width in the X direction is substantially equal to the width of the fitting head portion 28 of the clip 1. As will be described later, the respective elastic locking pieces 31, 31 of the clip 1 are elastically locked with the respective longer side portions of the long hole 42.

Next, a method of attaching the console box 2 to the attachment receiving member 41 which is a metal plate (body) to constitute an automobile body via the thus-structured clip 1 will be described based on FIGS. 27 to 29.

Figure 27:
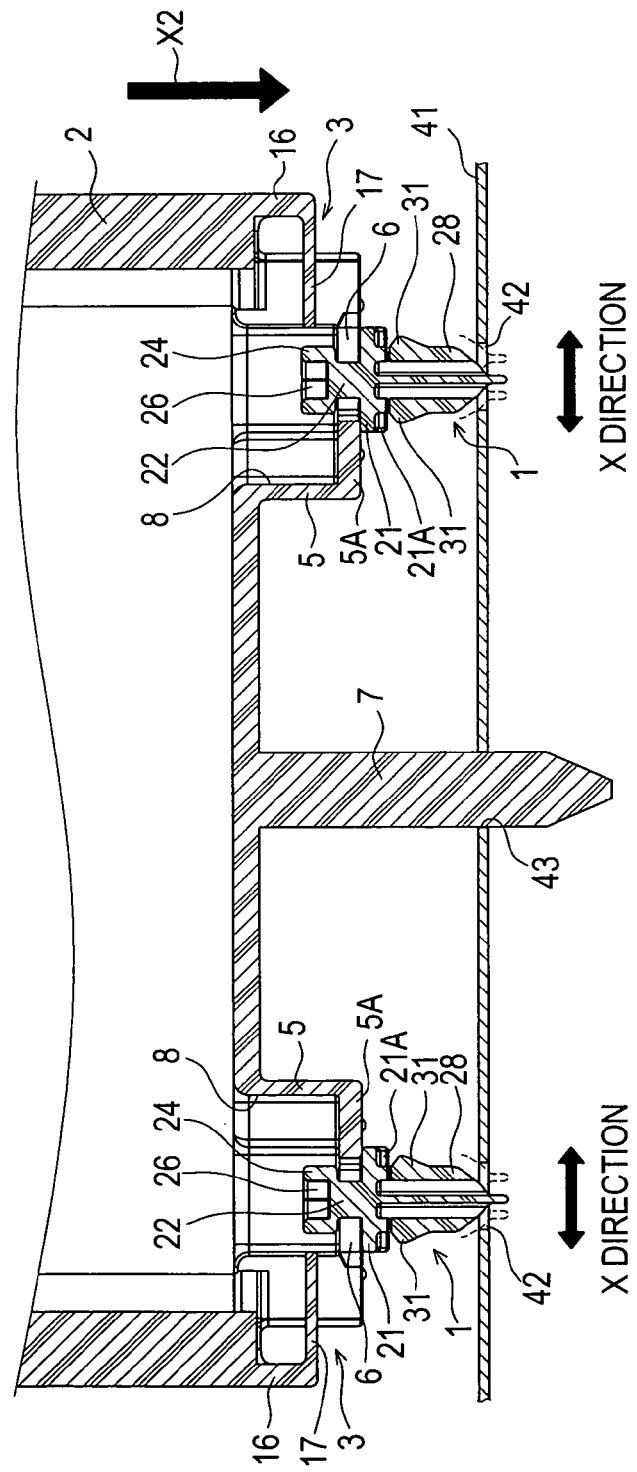
FIG. 27 is an essential part cross-sectional view for illustrating a process of attaching the console box to the attachment receiving member via the clip.

FIG. 27 is an essential part cross-sectional view for illustrating a process of attaching the console box 2 to the attachment receiving member 41 via the clip 1. FIG. 28 is an essential part cross-sectional view showing a state where the console box 2 is locked to the attachment receiving member 41 via the chip 1. FIG. 29 is a bottom view showing a state where the console box 2 is locked to the attachment receiving member 41 via the clip 1.

As shown in FIG. 27, while fitting the positioning boss 7 provided on the bottom surface portion of the console box 2 in an upright posture into the long hole 43 (first long hole) of a longitudinal oval shape when seen from above, the top end of the fitting head portion 28 of the clip 1 assembled to the respective assembling portions 3 of the console box 2 is inserted into each long hole 42 (second long hole) of the attachment receiving member 41 opposing to the top end of the fitting head portion 28. The top end of the fitting head portion 28 is depressed downward (in the direction of the arrow X2) so as to insert the respective fitting head portions 28 and the positioning boss 7 into the respective long holes 42, 43. At this time, since the width at the midway position along the longer diameter of the long hole 43 in a longitudinal oval shape when seen from above is substantially equal to the maximum width of the positioning boss 7 in its axially vertical cross section, the console box 2 moves downward in a state where it is positioned relative to the shorter diameter direction (X direction in FIG. 25) of the long hole 43.

Further, the long hole 42 is penetratively formed so that its longitudinal direction (Y direction in FIG. 25) is placed at substantially right angle along the longitudinal direction of the cutaway groove portion 6 formed on the upper wall 5A of the pedestal portion 5 of the console box 2. Thus, the respective elastic locking pieces 31, 31 of the clip 1 are inserted into the respective long holes 42 in a state opposing the respective longer side portions of the long hole 42 (see FIG. 29). This inserting operation is continued until the respective contact portions 21A of the flat plate portion 21 of each clip 1 are brought into contact with the attachment receiving member 41.

Figure 29:
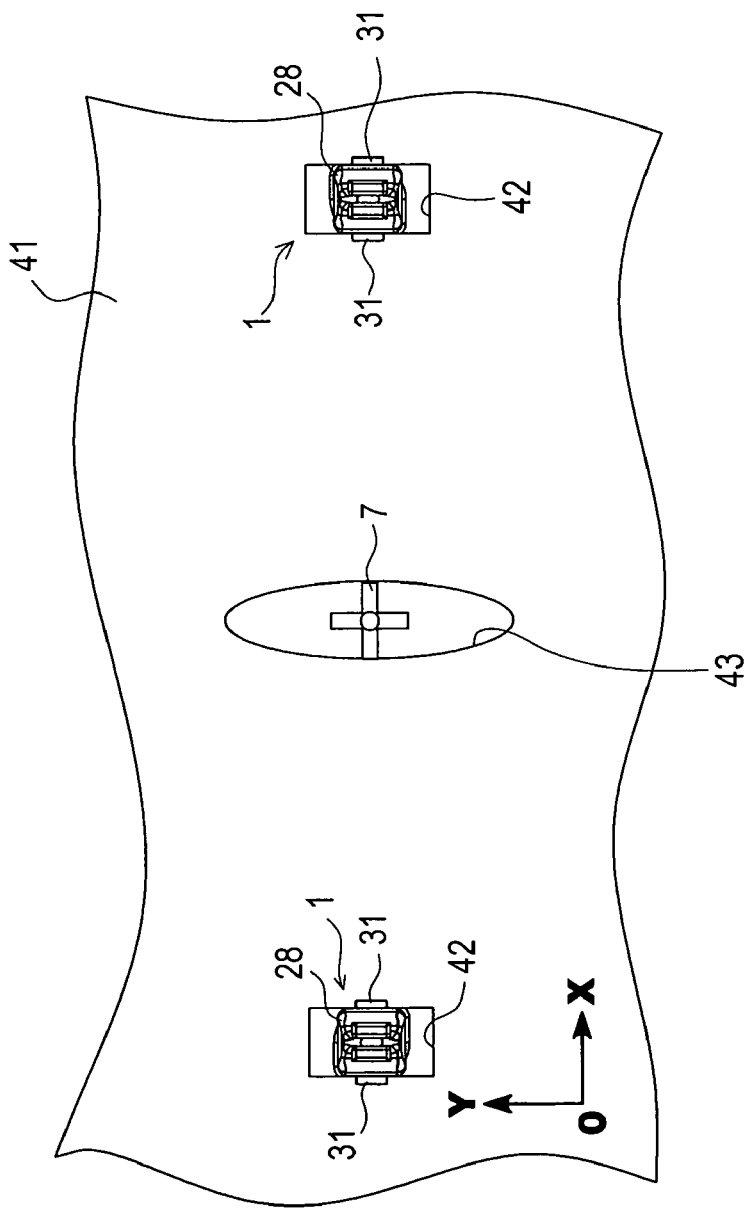
FIG. 29 is a bottom view showing a state where the console box is locked to the attachment receiving member via the clip.

Further, as shown in FIG. 29, the width of each long hole 42 in a direction at right angle relative to the longitudinal direction thereof, that is, the width in the X direction, is substantially equal to the width of the fitting head portion 28 of the clip 1. Due to this structure, as shown in FIG. 27, when the top end portion of each fitting head portion 28 is inserted into each long hole 42 of the attachment receiving member 41 and is depressed downward (in a direction of the arrow X2), if each fitting head portion 28 and each long hole 42 is deviated from each other in the X direction (in a direction at right angle relative to the longitudinal direction of each long hole 42), the clip 1 slides in the X direction within the cutaway groove portion 6 along the inclined surface of the top end portion of each fitting head portion 28. Thus, each fitting head portion 28 is fitted into each long hole 42 positioned in the X direction relative to the each long hole 42 of the attachment receiving member 41. As a result, the positional deviation in a direction at right angle (X direction in FIG. 29) relative to the longitudinal direction of the long hole 42 between the clip 1 assembled to each assembling portion 3 of the console box 2 and each long hole 42 is absorbed. Thus, the fitting head portion 28 of each clip 1 can be fitted into each long hole 42.

Further, as shown in FIG. 29, the longitudinal width of each long hole 42 (width in the Y direction in FIG. 29) is larger than the width of the fitting head portion 28. Therefore, the positional deviation in the longitudinal direction of each long hole 42 (Y direction in FIG. 29) between the clip 1 assembled to each assembling portion 3 of the console box 2 and each long hole 42 can be absorbed.

Then, as the console box 2 is further depressed downward (in the direction of the arrow X2) from the state shown in FIG. 27, the respective elastic locking pieces 31, 31 are brought into contact with the respective longer side portions of the long hole 42 and are elastically deformed inward so as to be pushed into the respective hole portions 29. As a result, each long hole 42 passes through the elastic locking pieces 31, 31 and is fitted to the base end portion of the fitting head portion 28, and the attachment receiving member 41 is brought into contact with each contact portion 21A of the flat plate portion 21. At the same time, the respective elastic locking pieces 31, 31 again are elastically deformed outward, and each inclined surface inclined obliquely downward toward the flat plate portion 21 comes elastically into contact with each longer side portion of each long hole 42, so that each clip 1 is locked with each long hole 42 (see the left drawing in FIG. 30). This state is shown in FIGS. 28 and 29.

Figure 28:
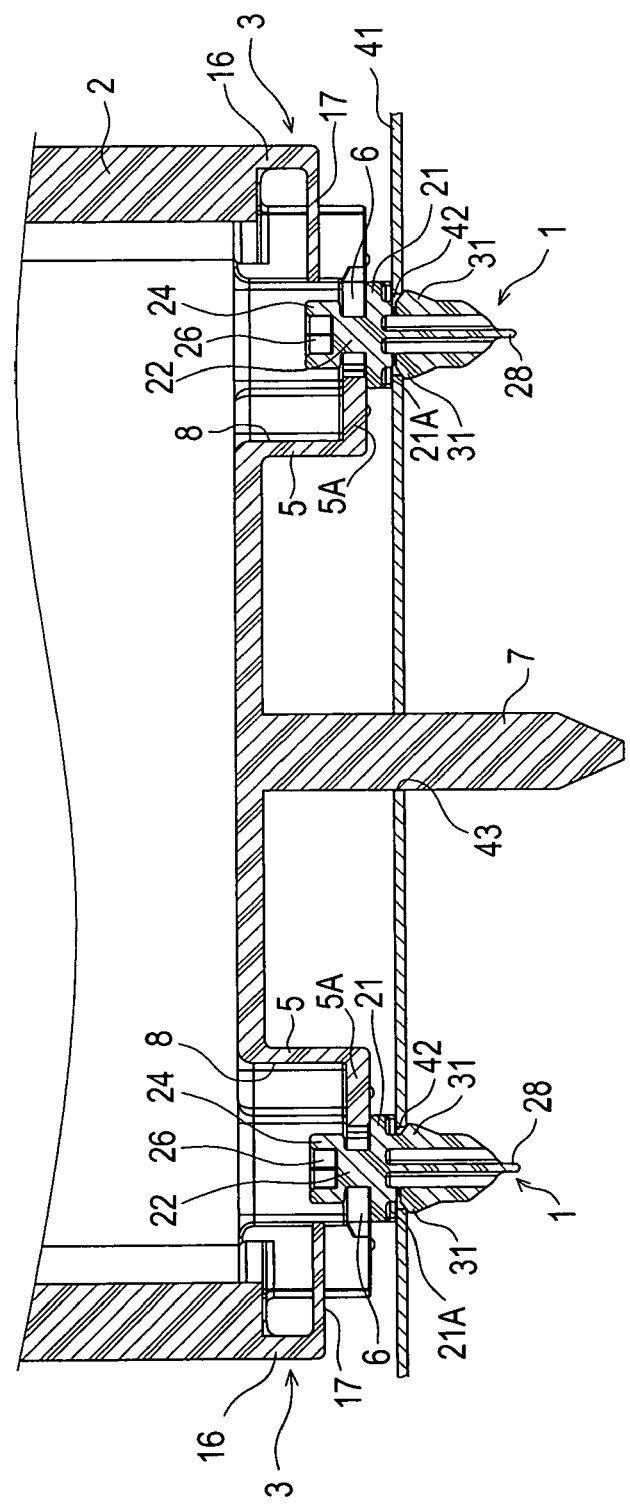
FIG. 28 is an essential part cross-sectional view showing a state where the console box is locked to the attachment receiving member via the chip.

In the state shown in FIGS. 28 and 29, each long hole 42 passes through the respective elastic locking pieces 31, 31 of the clip 1 and is fitted to the base end portion of the fitting head portion 28. At the same time, each inclined surface of the respective elastic locking pieces 31, 31 inclined obliquely downward toward the side of the flat plate portion 21 comes elastically into contact with each longer side portion of each long hole 42 of the attachment receiving member 41, and pushes the attachment receiving member 41 upward (upward in FIG. 28), so that each clip 1 is locked with each long hole 42. Further, each contact portion 21A of each flat plate portion 21 is brought into a state where it is pushed against the attachment receiving member 41.

As a result, the console box 2 is attached to the attachment receiving member 41. Since the positioning boss 7 is fitted to the midportion in a long diameter direction of the long hole 43 having a longitudinal oval shape when seen from above, the positional deviation in a direction at right angle (X direction in FIG. 29) relative to the longitudinal direction of the long hole 43 and rattling of the console box 2 can be assuredly prevented. That is, the positional deviation in a direction of the shorter side of the long hole 42 (X direction in FIG. 29) and rattling of each clip 1 can be assuredly prevented.

As described above, the console box 2 is attached to the attachment receiving member 41 by locking each clip 1 with each long hole 42. Next, an operation of releasing the locked state of each clip 1 with each long hole 42 to detach the console box 2 from the attachment receiving member 41 will be described based on FIGS. 30 to 32.

Figure 30:
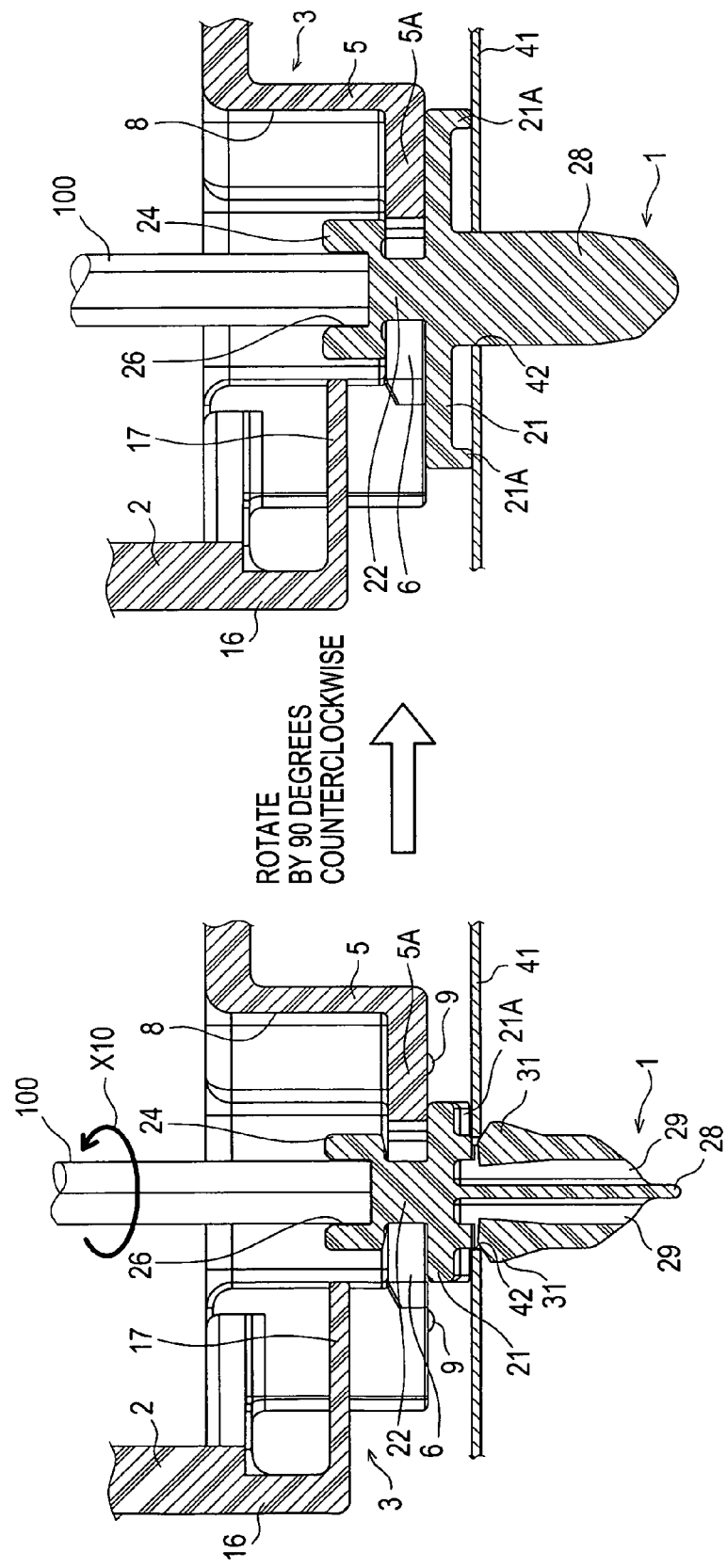
FIG. 30 is a diagram for illustrating a method of releasing the locked state between the clip and the attachment receiving member by means of a tool.
Figure 31:
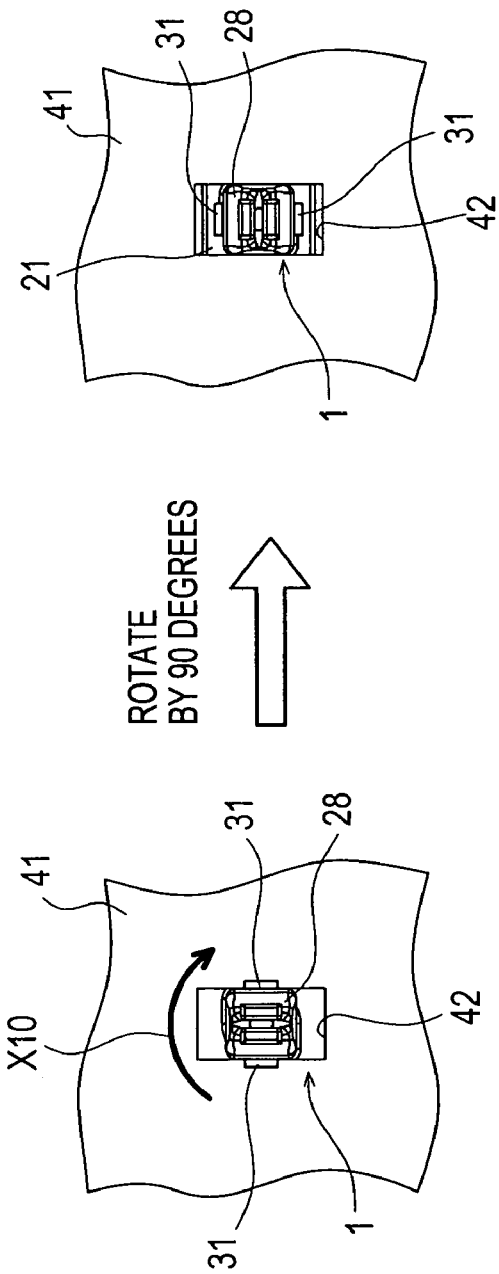
FIG. 31 is a bottom view in the case where the locked state between the clip and the attachment receiving member is released by means of a tool.
Figure 32:
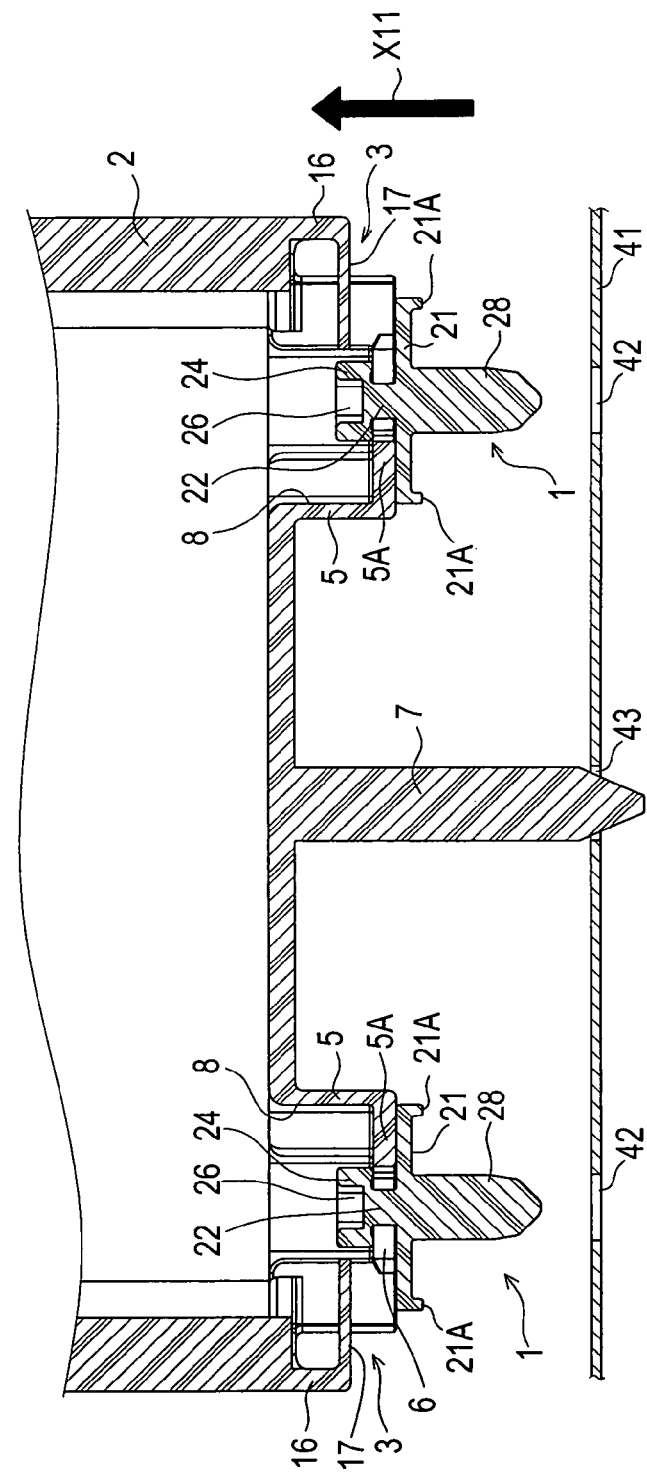
FIG. 32 is a diagram for illustrating a state where the console box is detached from the attachment receiving member.

FIG. 30 is a diagram for illustrating a method of releasing the locked state between the clip 1 and the attachment receiving member 41 by means of a tool. FIG. 31 is a bottom view in the case where the locked state between the clip 1 and the attachment receiving member 41 is released by means of a tool. FIG. 32 is a diagram for illustrating a state where the console box 2 is detached from the attachment receiving member 41.

As shown in FIG. 30, first of all, a tool 100 such as a hexagonal wrench having a hexagonal shape in cross section is inserted into one of tool holes 8 from the side opposite to the side where each assembling portion 3 of the console box 2 is formed. Then, the top end portion of the tool 100 is inserted into the recessed portion 26 having a hexagonal shape in horizontal cross section and formed at the flange portion 24 of one of the clips 1.

Then, the tool 100 is rotated counterclockwise (in the direction of the arrow X10). As a result, as described above, the base end portion of the fitting head portion 28 rotates within the long hole 42 only by 90 degrees counterclockwise due to the axially vertical cross sectional shapes of the base end portion of the fitting head portion 28 of the clip 1 and the boss portion 22. At the same time, the boss portion 22 rotates only by 90 degrees counterclockwise within the cutaway groove portion 6 to which the boss portion 22 is fitted. As a result, the clip 1 rotates over each protruding portion 9 and stops after 90 degrees of counterclockwise rotation. Next, the tool 100 is withdrawn from one of the clips 1, and is inserted to the other tool hole 8 to rotate the other clip 1 similarly and to step after 90 degrees of counterclockwise rotation. Even after the tool 1 is withdrawn from each clip 1, the clip 1 never returns to the locked position, because if the clip 1 axially rotates, the side surface portion of the flat plate portion 21 comes into contact with each protruding portion 9.

As a result, as shown in FIG. 31, when the clip 1 is rotated only by 90 degrees counterclockwise (in the direction of the arrow X10) and is stopped, the respective elastic locking pieces 31, 31 are positioned in the longitudinal direction of the long hole 42 of the attachment receiving member 41. Thus, the locked state between the respective elastic locking pieces 31, 31 and the long hole 42 is released.

Subsequently, as shown in FIG. 32, the console box 2 is lifted upward (in the direction of the arrow X11) from the attachment receiving member 41 to withdraw each clip 1 from each long hole 42 as well as to withdraw the positioning boss 7 from the long hole 43. As a result, the console box 2 can be detached from the attachment receiving member 41.

Therefore, according to the clip 1 of this embodiment, the boss portion 22 vertically extended downward from the bottom surface of the flat plate portion 21 of the clip 1 is slipped into a horizontally long cutaway groove portion 6 formed on the upper wall 5A of the pedestal portion 5 of the console box 2 from one of the side surface portions. Thus, the upper wall 5A of the pedestal portion 5 is pinched between the flat plate portion 21 and the flange 24 formed on the lower end portion of the boss portion 22. As a result, the clip 1 can be always integrally handled with the console box 2 to which the clip 1 is assembled. Further, the flange portion 24 of the clip 1 is brought into contact with the extending portion 17 formed in the base end portion 4. Then, the boss portion 22 of the clip 1 is fitted to the cutaway groove portion 6 of the pedestal portion 5 while depressing the extending portion 17 downward. As a result, the flange portion 24 of the clip 1 is opposed to the top end portion of the extending portion 17, and the clip 1 is prevented from slipping off the pedestal portion 5. Due to this, each clip 1 can be always kept at the console box 2 in a state where the clip 1 is slidable along the cutaway groove portion 6. At the same time, each clip 1 can be always integrally handled with the console box 2 to which the clip 1 is assembled.

After the boss portion 22 of each clip 1 is fitted and assembled to the cutaway groove portion 6 of the pedestal portion 5 of each assembling portion 3 provided on the bottom surface portion of the console box 2, the positioning boss 7 is fitted to the long hole 43 penetratively formed in the attachment receiving member 41 in the direction at substantially right angle relative to the longitudinal direction of the cutaway groove portion 6. At the same time, the fitting head portion 28 of each clip 1 is fitted to each long hole 42 penetratively formed in the attachment receiving member 41 in the direction at substantially right angle relative to the longitudinal direction of the cutaway groove portion 6. As each fitting head portion 28 is fitted to each long hole 42 penetratively formed in the attachment receiving member 41, the boss portion 22 slides in the cutaway groove portion 6 to bring a pair of contact portions 21A extended upward to a predetermined height at substantially right angle from the opposite edge portions in the longitudinal direction of the flat plate portion 21 into contact with the attachment receiving member 41, and also to elastically lock each of a pair of elastic locking pieces 31 with the periphery of each longer side portion of each long hole 42.

As a result, the positional deviation of the console box 2 in a longitudinal direction of the long hole 43 and each long hole 42 of the attachment receiving member 41 can be absorbed. At the same time, by fitting the positioning boss 7 of the console box 2 into the long hole 43 of the attachment receiving member 41, the console box 2 can be positioned in the direction at right angle relative to the longitudinal direction of the long hole 43 of the attachment receiving member 41. Further, as the boss portion 22 vertically extended downward from the bottom surface of the flat plate portion 21 of each clip 1 slides in the cutaway groove portion 6, each clip 1 moves in the direction at right angle relative to the longitudinal direction of each long hole 42. As a result, the positional deviation of the clip 1 in the direction at right angle relative to the longitudinal direction of each long hole 42 of the attachment receiving member 41 can be also absorbed.

Therefore, each clip 1 can be always integrally handled with the console box 2 to which the clip 1 is assembled. In addition, the console box 2 can be positioned in the direction at right angle relative to the longitudinal direction of the long hole 43 while easily absorbing the positional deviation of the of the console box 2 relative to the longitudinal direction of the long hole 43 penetratively formed in the attachment receiving member 41. Thus, the console box 2 can be attached to the attachment receiving member 41 in an extremely easy one-touch operation. Further, since two assembling portions 3 are provided on the bottom surface portion of the console box 2, after the console box 2 is attached to the attachment receiving member 41, the positional deviation relative to the attachment receiving member 41 and rattling of the console box 2 due to the impact exerted to the console box 2 can be assuredly prevented.

Further, a pair of contact portions 21A extended upward to a predetermined height at substantially right angle from the opposite edge portions in the longitudinal direction of the flat plate portion 21 of the clip 1 is brought into contact with the attachment receiving member 41. At the same time, a pair of elastic locking pieces 31 of the clip 1 is elastically locked with the periphery of each longer side portion of the long hole 42 of the attachment receiving member 41. Due to this structure, the attachment receiving member 41 is pinched between the pair of contact portions 21A and the pair of elastic locking pieces 31. Thus, looseness of the clip 1 and such can be assuredly prevented.

Further, the locked state between a pair of elastic locking pieces 31 of the clip 1 and the long holes 42 of the attachment receiving member 41 can be released by inserting the tool 100 through the tool hole 8 into the recessed portion 26 of the clip 1 and rotating the clip 1 by 90 degrees counterclockwise. Because of this structure, the console box 2 can be detached from the attachment receiving member 41 in an extremely easy operation as is the case of screw cramp.

The present invention is not limited to the foregoing embodiment. It is a matter of course that various improvements and modifications are possible as far as not departing from the gist of the present invention. For example, the present invention may be modified as follows.

(A) As shown in FIGS. 33 to 36, a water-proof elastic member 51 which is resistant to water, and is made of an elastic member such as a rubber may be attached to each clip 1. The water-proof elastic member 51 is a flat plate-like horizontally long rectangular shape when seen from above which is substantially identical to the flat plate portion 21 and a through hole 51A having a substantially square shape when seen from above is penetratively formed at the center portion. The through hole 51A can be fitted to the fitting head portion 28 of the clip 1. The thickness of the water-proof elastic member 51 is arranged to be larger than the height of the pair of contact portions 21A extended upward to a predetermined height at substantially right angle from the opposite edge portions in a longitudinal direction of the flat plate portion 21, and enables to be locked with the pair of elastic locking pieces 31.

Figure 37:
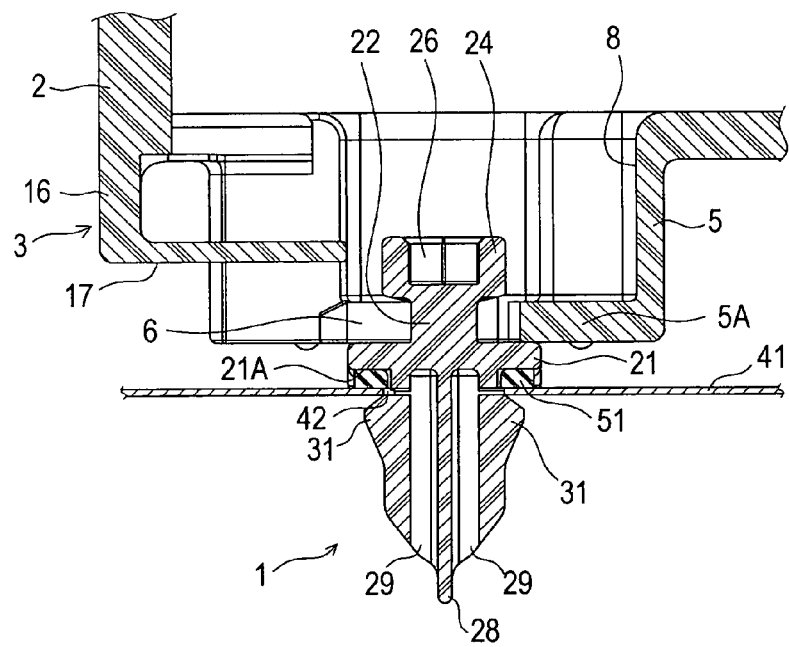
FIG. 37 is an essential part enlarged cross-sectional view at substantially right angle relative to the longitudinal direction of the long hole showing a state where the console box is attached to the attachment receiving member via each clip provided with the water-proof elastic member.
Figure 38:
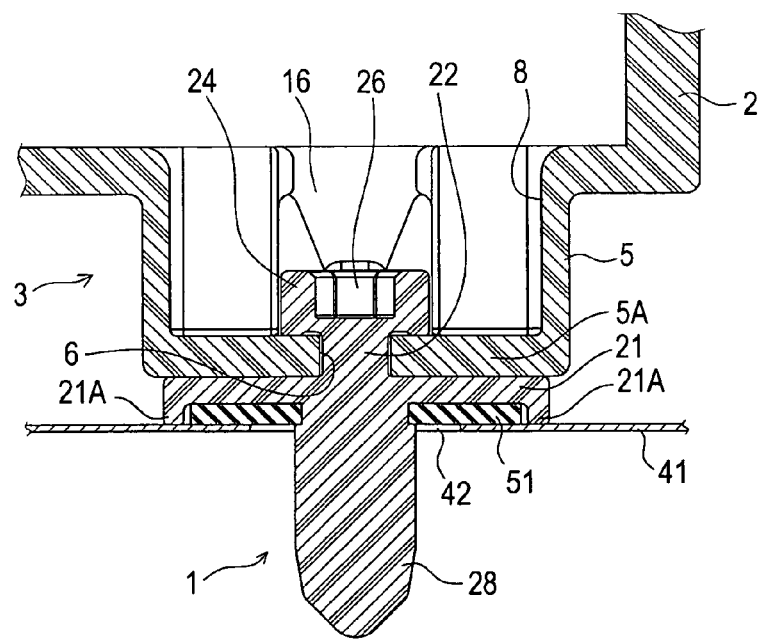
FIG. 38 is an essential part enlarged cross-sectional view along the longitudinal direction of the long hole, showing a state where the console box is locked with the attachment receiving member via each clip provided with the water-proof elastic member.

Due to this structure, as shown in FIGS. 37 and 38, when the console box 2 is attached to the attachment receiving member 41 by attaching the water-proof elastic member 51 to the clip 1 to be attached to each assembling portion 3 of the console box 2, each contact portion 21A is brought into contact with the attachment receiving member 41. At the same time, a pair of elastic locking pieces 31 is elastically locked with the periphery of each longer side portion of each long hole 42 of the attachment receiving member 41, so that the water-proof elastic member 51 is compressed in the thickness direction thereof and is pinched between the flat plate portion 21 and the attachment receiving member 41. As a result, each long hole 42 can be assuredly waterproof.

Figure 33:
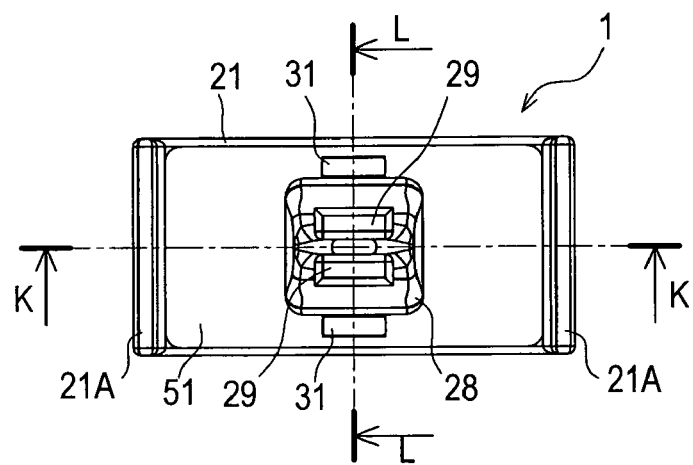
FIG. 33 is a plan view showing a state where the water-proof elastic member is attached to the clip.
Figure 34:
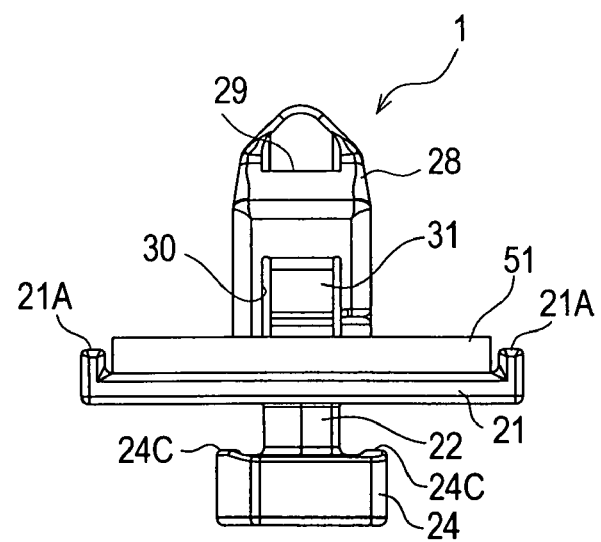
FIG. 34 is a front view showing a state where the water-proof elastic member is attached to the clip.
Figure 35:
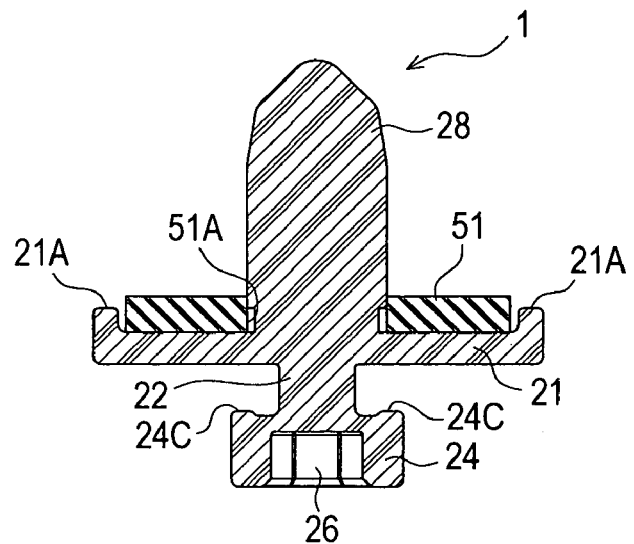
FIG. 35 is a cross-sectional view taken along the line K-K of FIG. 33.
Figure 36:
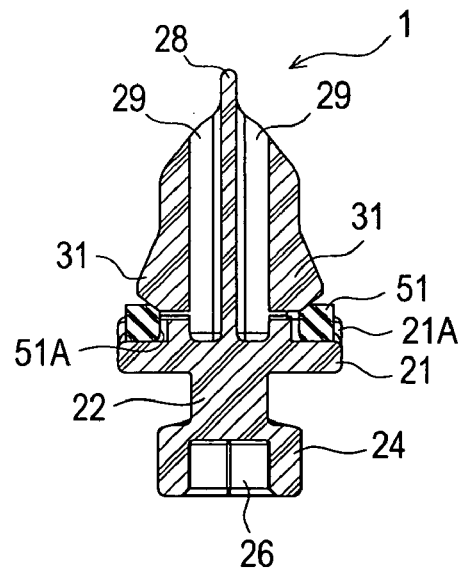
FIG. 36 is a cross-sectional view taken along the line L-L of FIG. 33.

Here, FIG. 33 is a plan view showing a state where the water-proof elastic member 51 is attached to the clip 1. FIG. 34 is a front view showing a state where the water-proof elastic member 51 is attached to the clip 1. FIG. 35 is a cross-sectional view taken along the line K-K of FIG. 33. FIG. 36 is a cross-sectional view taken along the line L-L of FIG. 33. FIG. 37 is an essential part enlarged cross-sectional view at substantially right angle relative to the longitudinal direction of the long hole 42 showing a state where the console box 2 is attached to the attachment receiving member 41 via each clip 1 provided with the water-proof elastic member 51. FIG. 38 is an essential part enlarged cross-sectional view along the longitudinal direction of the long hole 42, showing a state where the console box 2 is locked with the attachment receiving member 41 via each clip 1 provided with the water-proof elastic member 51.

(B) Further, in the foregoing embodiment, the recessed portion 26 of the clip 1 is formed into a substantially hexagonal shape in its horizontal cross section. Alternatively, the recessed portion 26 may be in a horizontally long rectangular shape in its horizontal cross section. In this case, the clip 1 is rotated counterclockwise by use of a minus driver and the like to detach the console box 2 from the attachment receiving member 41. Still alternatively, the recessed portion 26 may be formed into a special shape such as a star shape in its horizontal cross section, so that the clip 1 can be rotated only by use of a dedicated tool.

The invention claimed is:

1. A clip assembled to an upper surface portion of a pedestal portion provided on one surface of an attachment member and used to attach the attachment member to an attachment receiving member,
   wherein the pedestal portion formed into a substantially square-bracket-like shape opened downward when seen from a side view comprises a horizontally long cutaway groove portion formed inward from a side surface portion of an upper wall,
   the attachment member comprises a positioning boss provided in an upright posture on the one surface,
   the attachment receiving member comprises a first long hole which is penetratively formed along a direction at a substantially right angle relative to a longitudinal direction of the cutaway groove portion and to which the positioning boss is fitted,
   wherein the clip comprising:
   a flat plate portion to be brought into contact with an upper surface portion of the upper wall;
   a boss portion which is extended vertically downward from a bottom surface of the flat plate portion into a width substantially equal to a width of the cutaway groove portion, and is fitted to the cutaway groove portion;
   a flange portion having a predetermined thickness which is extended from a lower end portion of the boss portion outward to the opposite sides of the cutaway groove portion so as to be brought into contact with a bottom surface portion of the upper wall;
   a fitting head portion having a substantially square shape when seen from above which is provided in an upright posture on an upper surface of the flat plate portion and is fitted to a second long hole penetratively formed in the attachment receiving member along a direction at a substantially right angle relative to a longitudinal direction of the cutaway groove portion;
   a pair of elastic locking pieces elastically deformable in an inward direction of the fitting head portion and is provided on opposite side surface portions of the fitting head portion in a longitudinal direction of the cutaway groove portion, and is formed with, at their respective lower end portion, a locking protrusion protruding outward to a predetermined height; and
   a pair of contact portions extended to a predetermined height upward at a substantially right angle from the opposite edge portions of the flat plate in a direction at substantially right angle relative to a longitudinal direction of the cutaway groove,
   wherein the positioning boss is fitted to the first long hole penetratively formed in the attachment receiving member, and as the fitting head portion is fitted to the second long hole penetratively formed in the attachment receiving member and the boss portion moves in the cutaway groove portion, the pair of contact portions is brought into contact with the attachment receiving member and the pair of elastic locking pieces is elastically locked with a periphery of each longer side portion of the second long hole.

2. A clip according to claim 1, wherein the attachment member comprises:
   a rib portion provided in an upright posture on the outside of the side surface portion of the upper wall of the pedestal; and
   an extending portion elastically deformable downward and extending from the rib portion at a height opposing to the flange portion substantially vertically up to an inlet portion of the cutaway groove portion, and
   wherein when the boss portion is fitted to the cutaway groove portion, the flange portion moves while depressing the extending portion downward.

3. A clip according to claim 2, wherein
   the attachment member has a tool hole penetratively formed at a position opposing to the upper wall of the pedestal portion,
   the flange portion has a recessed portion into which a top end portion of a tool is inserted and formed at the bottom,
   a portion of the fitting head portion opposing to an inner peripheral surface of the second long hole and the boss portion respectively assumes a substantially square shape as a whole in a horizontal cross section, a pair of opposing corners respectively creates a circular arc having one side of the respective square as a diameter, and the other pair of opposing corners respectively creates a substantially right angle, and when the tool is inserted through the tool hole into the recessed portion and rotated by 90 degreed counterclockwise, a locked state between the second long hole and the pair of elastic locking pieces is released.

4. A clip according to claim 3, further comprising a flat plate-like water-proof elastic member formed with a through hole having a substantially square shape when seen from above and having a width substantially equal to a width of the fitting head portion, and is brought into contact with the upper surface of the flat plate portion by fitting and inserting the fitting head portion into the through hole, wherein the water-proof elastic member has a thickness which is larger than a height of the contact portions and also enables the water-proof elastic member to be locked with the pair of elastic locking pieces.

5. A clip according to claim 2, further comprising a flat plate-like water-proof elastic member formed with a through hole having a substantially square shape when seen from above and having a width substantially equal to a width of the fitting head portion, and is brought into contact with the upper surface of the flat plate portion by fitting and inserting the fitting head portion into the through hole, wherein the water-proof elastic member has a thickness which is larger than a height of the contact portions and also enables the water-proof elastic member to be locked with the pair of elastic locking pieces.

6. A clip according to claim 1, wherein the attachment member has a tool hole penetratively formed at a position opposing to the upper wall of the pedestal portion, the flange portion has a recessed portion into which a top end portion of a tool is inserted and formed at the bottom, a portion of the fitting head portion opposing to an inner peripheral surface of the second long hole and the boss portion respectively assumes a substantially square shape as a whole in a horizontal cross section, a pair of opposing corners respectively creates a circular arc having one side of the respective square as a diameter, and the other pair of opposing corners respectively creates a substantially right angle, and when the tool is inserted through the tool hole into the recessed portion and rotated by 90 degreed counterclockwise, a locked state between the second long hole and the pair of elastic locking pieces is released.

7. A clip according to claim 6, further comprising a flat plate-like water-proof elastic member formed with a through hole having a substantially square shape when seen from above and having a width substantially equal to a width of the fitting head portion, and is brought into contact with the upper surface of the flat plate portion by fitting and inserting the fitting head portion into the through hole, wherein the water-proof elastic member has a thickness which is larger than a height of the contact portions and also enables the water-proof elastic member to be locked with the pair of elastic locking pieces.

8. A clip according to claim 1, further comprising a flat plate-like water-proof elastic member formed with a through hole having a substantially square shape when seen from above and having a width substantially equal to a width of the fitting head portion, and is brought into contact with the upper surface of the flat plate portion by fitting and inserting the fitting head portion into the through hole, wherein the water-proof elastic member has a thickness which is larger than a height of the contact portions and also enables the water-proof elastic member to be locked with the pair of elastic locking pieces.

* * * * *